United States Patent
Rost et al.

(10) Patent No.: US 11,155,663 B2
(45) Date of Patent: Oct. 26, 2021

(54) PROCESS FOR PREPARING AN AQUEOUS POLYMER LATEX

(71) Applicant: BASF SE, Ludwigshafen am Rhein (DE)

(72) Inventors: Tanja Rost, Mannheim (DE); Roelof Balk, Boehl-Iggelheim (DE); Immanuel Willerich, Limburgerhof (DE); Sebastian Enck, Jakarta (ID); Joost Leswin, Mannheim (DE); Wolfgang Gaschler, Ludwigshafen (DE); Martin Robert Scheuble, Gruenstadt (DE)

(73) Assignee: BASF SE, Ludwigshafen am Rhein (DE)

( * ) Notice: Subject to any disclaimer, the term of this patent is extended or adjusted under 35 U.S.C. 154(b) by 87 days.

(21) Appl. No.: 16/098,010

(22) PCT Filed: May 3, 2017

(86) PCT No.: PCT/EP2017/060487
§ 371 (c)(1),
(2) Date: Oct. 31, 2018

(87) PCT Pub. No.: WO2017/191167
PCT Pub. Date: Nov. 9, 2017

(65) Prior Publication Data
US 2019/0144585 A1 May 16, 2019

(30) Foreign Application Priority Data
May 4, 2016 (EP) .................................. 16168352

(51) Int. Cl.
| | | |
|---|---|---|
| C08F 220/14 | (2006.01) | |
| C08F 212/08 | (2006.01) | |
| C09D 133/02 | (2006.01) | |
| C09D 133/08 | (2006.01) | |
| C08F 220/18 | (2006.01) | |
| C09D 133/12 | (2006.01) | |
| C08F 2/22 | (2006.01) | |
| C08F 220/06 | (2006.01) | |
| C08K 3/22 | (2006.01) | |

(52) U.S. Cl.
CPC .............. *C08F 220/18* (2013.01); *C08F 2/22* (2013.01); *C08F 212/08* (2013.01); *C08F 220/06* (2013.01); *C08F 220/14* (2013.01); *C08K 3/22* (2013.01); *C09D 133/02* (2013.01); *C09D 133/08* (2013.01); *C09D 133/12* (2013.01); *C08F 220/1804* (2020.02); *C08F 220/1806* (2020.02); *C08F 220/1808* (2020.02); *C08F 2800/20* (2013.01); *C08K 2003/2241* (2013.01)

(58) Field of Classification Search
CPC .... C08F 220/06; C08F 220/14; C08F 220/18; C08F 222/02; C09D 133/02; C09D 133/08
See application file for complete search history.

(56) References Cited

U.S. PATENT DOCUMENTS

| 7,179,531 | B2 * | 2/2007 | Brown ..................... C08F 2/001 |
| --- | --- | --- | --- |
| | | | 428/407 |
| 9,090,793 | B2 * | 7/2015 | Ratering .............. C09D 133/12 |
| 9,303,161 | B2 * | 4/2016 | Bohling ................ C08F 265/04 |
| 9,447,215 | B2 * | 9/2016 | Bohling .................. C09D 7/62 |
| 9,944,783 | B2 * | 4/2018 | Junk ...................... C08F 265/06 |
| 2004/0054063 | A1 | 3/2004 | Brown et al. |
| 2012/0129965 | A1 * | 5/2012 | Tuchbreiter ............ C09D 7/70 |
| | | | 521/139 |
| 2013/0190448 | A1 * | 7/2013 | Deller ................... C08F 220/18 |
| | | | 524/833 |
| 2014/0018473 | A1 * | 1/2014 | Ratering .............. C09D 131/04 |
| | | | 523/437 |
| 2015/0307716 | A1 | 10/2015 | Jahns et al. |
| 2019/0144585 | A1 * | 5/2019 | Rost ...................... C08F 220/06 |
| | | | 526/80 |

(Continued)

FOREIGN PATENT DOCUMENTS

| CN | 1488693 A | 4/2004 |
| --- | --- | --- |
| CN | 102604003 A | 7/2012 |
| CN | 103261306 A | 8/2013 |
| CN | 104781351 A | 7/2015 |
| CN | 104974289 A | 10/2015 |
| DE | 40 03 422 A1 | 8/1991 |
| DE | 196 24 299 A1 | 1/1997 |
| DE | 196 21 027 A1 | 11/1997 |

(Continued)

OTHER PUBLICATIONS

International Search Report dated Jul. 26, 2017 in PCT/EP2017/060487 filed May 3, 2017.

*Primary Examiner* — Rip A Lee

(74) *Attorney, Agent, or Firm* — Faegre Drinker Biddle & Reath LLP

(57) ABSTRACT

Disclosed herein is a process for preparing an aqueous polymer latex by polymerising a monomer composition M by a radical emulsion polymerisation, where at least 95% of the monomer composition M is metered during a period P to the polymerisation reaction under polymerisation conditions, such that during at least one period P(n) within the period P, the relative amount of monomers M2, which are metered to the polymerisation reaction during the periods P(n), to the total amount of the monomer composition M, which is metered to the polymerisation reaction during said period P(n), is at least 1% by weight higher than the relative amount of monomers M2, which are metered to the polymerisation reaction outside of each of said periods P(n), to the total amount of the monomer composition M, which is metered to the polymerisation reaction outside of each of said periods P(n).

27 Claims, No Drawings

(56) References Cited

U.S. PATENT DOCUMENTS

2019/0241762 A1* 8/2019 Willerich ............... C09D 5/022

FOREIGN PATENT DOCUMENTS

| | | |
|---|---|---|
| DE | 197 41 184 A1 | 3/1999 |
| DE | 197 41 187 A1 | 3/1999 |
| DE | 198 05 122 A1 | 4/1999 |
| DE | 198 28 183 A1 | 12/1999 |
| DE | 198 39 199 A1 | 3/2000 |
| DE | 198 40 586 A1 | 3/2000 |
| DE | 198 47 115 C1 | 5/2000 |
| EP | 0 771 328 A | 5/1997 |
| EP | 1 398 333 A1 | 3/2004 |
| EP | 2 426 155 A1 | 3/2012 |
| EP | 2 692 752 A1 | 2/2014 |
| WO | WO 95/33775 A1 | 12/1995 |
| WO | WO 2012/082141 A1 | 6/2012 |
| WO | 2013/004004 A1 | 1/2013 |
| WO | WO 2013/116318 A1 | 8/2013 |

* cited by examiner

PROCESS FOR PREPARING AN AQUEOUS POLYMER LATEX

The present invention relates to a process for preparing an aqueous polymer latex by polymerising a monomer composition M by a radical emulsion polymerisation, where the monomer composition M consists of a) 80 to 99.95% by weight, based on the total weight of the monomer composition M, of ethylenically unsaturated monomers M1, which are selected from mixtures consisting of
  at least one monomer M1a, selected from $C_1$-$C_{20}$-alkyl esters of acrylic acid and $C_5$-$C_{20}$-alkylesters of methacrylic acid; and
  at least one monomer M1b, selected from vinyl aromatic monomers, and $C_1$-$C_4$-alkyl esters of methacrylic acid and mixtures thereof;
b) 0.05 to 5% by weight, based on the total weight of the monomer composition M, of one or more monoethylenically unsaturated monomers M2, which are selected from monoethylenically unsaturated monocarboxylic acids having 3 to 6 carbon atoms and monoethylenically unsaturated dicarboxylic acids having 4 to 6 carbon atoms;
c) 0 to 20% by weight of non-ionic monomers M3, which are different from monomers M1.

The present invention also relates to the aqueous polymer latex, which is obtainable by said process and to the use of said aqueous polymer latex as a binder or co-binder in a water-borne coating composition, which contains a titanium dioxide pigment.

Titandioxide ($TiO_2$) is frequently used as a pigment in water-borne coating compositions, such as latex paints. Besides whiteness, $TiO_2$ provides opacity or hiding power, respectively, to the coating, which means that the coating is opaque and concealingly covers an undersurface or substrate surface to which the coating is applied. The opacifying capacity or hiding power of such a coating or paint is a measure of the coating's ability to conceal a surface to which the coating is applied.

It was found that the opacifying capacity is a function of the spacing between the particles of opacifying pigment in the dried applied coating (see EP 1398333 and EP 2426155). Opacifying capacity of a coating is maximized when the light scattering capability of the opacifying pigment, namely $TiO_2$, is maximized. Maximum light scattering efficiency occurs when the $TiO_2$ pigment particles have a certain diameter and spacing, so that the light scattering capability of each particle does not interfere with the light scattering capability of its neighboring particles. This condition may occur in coatings containing sufficiently low levels of $TiO_2$ such that the individual $TiO_2$ particles are isolated from each other. Coatings containing such low levels of $TiO_2$, however, do not provide sufficient whiteness and hiding at typical dried coating thicknesses. Achieving the desired levels of hiding and whiteness typically requires higher levels of $TiO_2$. At these higher levels, a statistical distribution of $TiO_2$ particles occurs, which results in at least some of the $TiO_2$ particles being in such close proximity to one another that there is a loss of light scattering efficiency due to crowding of the opacifying pigment particles.

In short, the efficacy of the $TiO_2$ pigment as a hiding or opacifying pigment is reduced, when the $TiO_2$ particles are not homogeneously dispersed in the coating composition. In fact, $TiO_2$ particles tend to agglomerate upon film formation and drying. It has been suggested that the spacing of $TiO_2$ and its resultant efficiency can be improved by employing an adsorbing polymer latex, i.e. a polymer latex which is capable of adsorbing the $TiO_2$ particles on the surface of the polymer latex particles.

EP 1398333 A1 teaches that the spacing of $TiO_2$ pigment particles and its resultant efficiency can be improved by employing a multistage polymer latex comprising a first polymer having polymerized units of multi-ethylenically unsaturated monomers and at least one pendant absorbing group selected from phosphorous acid groups, phosphorous acid full-ester groups, polyacid sidechains, and a second polymer which is essentially free of such pendant absorbing groups. In order to achieve acceptable hiding power the polymer dispersions of EP 1398333 require expensive phosphorous containing monomers. Moreover, the coating formulations are not always stable and tend to flocculate resulting in the formation of grit in the coatings.

EP 2426155 A1 discloses aqueous multistage polymer dispersions containing polymerized units of phosphorous-containing acid monomers. The polymer dispersions are prepared by emulsion polymerization, where the phosphor containing acid monomers are added pulse-wise at an early stage of the emulsion polymerization. The multistage polymer dispersions are capable of absorbing $TiO_2$ pigment particles and used for preparing so-called pre-composites of the $TiO_2$ pigment and the aqueous multistage polymer dispersion. These pre-composites can be used in water-borne paints. The multistage polymer dispersions are suggested to achieve improved hiding power at acceptable scrub resistance and grit formation.

WO 2013/116318 discloses a process for preparing aqueous multistage polymer dispersions containing polymerized units of phosphor containing acid monomers, polymerized units of a carboxylic acid or sulfur acid monomer and polymerized units of a multi-ethylenically unsaturated monomer. The process is performed as an emulsion polymerization of a monomer emulsion in a preformed polymer dispersion, which comprises the polymerized units of phosphor containing acid monomers, polymerized units of a carboxylic acid or sulfur acid monomer and polymerized units of a multi-ethylenically unsaturated monomer. Based on the total polymer, the majority of phosphor containing acid monomers and polymerized units of a multi-ethylenically unsaturated monomer are contained in the preformed polymer dispersion. The polymer dispersions of WO 2013/116318 are used for preparing pre-composites of the $TiO_2$ pigment particles and should provide improved compatibility with $TiO_2$ pigment particles and reduced grit formation.

According to WO 2013/004004 grit formation in paints, which contain pre-composites of the $TiO_2$ pigments and polymer lattices, can be reduced, if the pre-composites of the $TiO_2$ pigment are prepared by a two-step process, where in the first step an aqueous slurry of a $TiO_2$ pigment is contacted with an absorbing polymer latex, such as described e.g. in EP 1398333 A1 or EP 2426155 A1, at a high pH in order to inhibit interaction between the $TiO_2$ pigment and the absorbing polymer latex particles and subsequently in a second step the pH is lowered to promote interaction between the $TiO_2$ pigment and the absorbing polymer latex particles.

According to EP 2692752 A1 grit formation in paints, which contain pre-composites of the $TiO_2$ pigments and polymer lattices and associative thickeners, can be reduced, if the $TiO_2$ pigment particles contain a water-soluble dispersant comprising structural units of a sulfonic acid monomer adsorbed on the surface of the pigment particles. This method suffers from the use of specific dispersants, which are not readily commercially available. The synthesis of the dispersants requires multiple solvents and specialty monomers.

The means suggested by prior art for improving the hiding or opacifying efficacy of the $TiO_2$ pigments are not satisfactory, as either the absorbing polymer dispersion requires expensive phosphorous containing monomers for achieving acceptable hiding or opacifying efficacy and flocculation stability or require expensive dispersants or tedious methods of preparing the $TiO_2$ pigment/polymer pre-composites.

It is an object of the present invention to provide aqueous polymer dispersions, which are capable of adsorbing the $TiO_2$ pigment particles and allow for providing $TiO_2$ pigment/polymer pre-composites, which can be easily incorporated into water-borne paints. The aqueous polymer dispersions should not require expensive phosphor containing monomers in order to achieve a good hiding/opacifying efficacy. Moreover, the aqueous polymer dispersions should provide for a good stability of the coating compositions and do not tend to form grit. Moreover, the aqueous polymer dispersion should provide good scrub resistance of the obtained coatings.

It was surprisingly found that these objectives can be achieved by radical emulsion polymerization of a monomer composition M, which consists of monomers M1, M2 and optionally M3 as defined at the outset, if the at least 95% of the monomer composition M to be polymerised are metered during a period P to the polymerisation reaction under polymerisation conditions, provided that during that period P the relative amount of monomers M2 to the total amount of the monomers is increased for at least one period P(n) to a value, which is at least 1% by weight higher than the relative amount of monomers M2 to the total amount of the monomers outside each of these periods P(n), or, in other words, during at least one period P(n), which is within said period P, the relative amount of monomers M2, which are metered to the polymerisation reaction during the periods P(n), to the total amount of the monomer composition M, which is metered to the polymerisation reaction during said period P(n), is at least 1% by weight higher than the relative amount of monomers M2, which are metered to the polymerisation reaction outside of each of said periods P(n), to the total amount of the monomer composition M, which is metered to the polymerisation reaction outside of each of said periods P(n), the first period P(n) starts at a point of time t(s) and the last period P(n) ends at a point of time t(e), where t(s) is at a point of time, where at least 10%, in particular at least 15%, of the total amount of the monomer composition M to be polymerised have been metered to the polymerisation reaction and where t(e) is at a point of time, where at most 90%, in particular at most 85%, of the total amount of the monomer composition M to be polymerised have been metered to the polymerisation reaction.

Consequently, a first aspect of the present invention relates to a process for preparing an aqueous polymer latex by polymerising a monomer composition M by a radical emulsion polymerisation, where the monomer composition M consists of a) 80 to 99.95% by weight, based on the total weight of the monomer composition M, of ethylenically unsaturated monomers M1, which are selected from mixtures of at least one monomer M1a and at least one monomer M1b as defined herein;

b) 0.05 to 5% by weight, based on the total weight of the monomer composition M, of one or more monoethylenically unsaturated monomers M2, which are selected from monoethylenically unsaturated monocarboxylic acid having 3 to 6 carbon atoms and monoethylenically unsaturated dicarboxylic acids having 4 to 6 carbon atoms;

c) 0 to 20% by weight of non-ionic monomers M3, which are different from monomers M1;

where at least 95% of the monomer composition M to be polymerised are metered during a period P to the polymerisation reaction under polymerisation conditions, wherein during at least one period P(n), which is within said period P, the relative amount of monomers M2, which are metered to the polymerisation reaction during the periods P(n), to the total amount of the monomer composition M, which is metered to the polymerisation reaction during said period P(n), is at least 1% by weight higher than the relative amount of monomers M2, which are metered to the polymerisation reaction outside of each of said periods P(n), to the total amount of the monomer composition M, which is metered to the polymerisation reaction outside of each of said periods P(n), where the first period P(n) starts at a point of time t(s) and the last period P(n) ends at a point of time t(e), where t(s) is at a point of time, where at least 10%, in particular at least 15%, of the total amount of the monomer composition M to be polymerised have been metered to the polymerisation reaction and where t(e) is at a point of time, where at most 90%, in particular at most 85%, of the total amount of the monomer composition M to be polymerised have been metered to the polymerisation reaction.

A second aspect of the present invention relates to an aqueous polymer latex, which is obtainable by the process of the invention. This polymer latex is preferably characterized that polymer particles of said latex at pH 12 and 22° C. have a Z average particle diameter of 1.1 to 1.8 times of the Z average diameter of the polymer particles at pH 8 and 22° C., as determined by dynamic light scattering (DLS) of an aqueous dilution of the latex at the respective pH. In the context of DLS, the aqueous dilution may have a polymer concentration in the range from 0.001 to 0.5% by weight, depending on the particle size.

A third aspect of the present invention relates to the use of the aqueous polymer latex of the invention as a binder or co-binder in water-borne coating compositions, which contain a titanium dioxide pigment.

A fourth aspect of the present invention relates to the use of the aqueous polymer latex of the invention for forming a particulate polymer composite of titanium dioxide particles.

A fifth aspect of the present invention relates to an aqueous dispersion of said particular polymer composite of titanium dioxide, where the aqueous dispersion contains composite particles of titanium dioxide particles and polymer particles of the aqueous polymer latex as described herein.

DETAILED DESCRIPTION OF INVENTION

Here and hereinafter, the prefixes $C_n$-$C_m$ used in connection with compounds or molecular moieties each indicate a range for the number of possible carbon atoms that a molecular moiety or a compound can have.

The term $C_1$-$C_n$ alkyl denominates a group of linear or branched saturated hydrocarbon radicals having from 1 to n carbon atoms. For example, the term $C_1$-$C_{20}$ alkyl denominates a group of linear or branched saturated hydrocarbon radicals having from 1 to 20 carbon atoms. Similarly, term $C_5$-$C_{20}$ alkyl denominates a group of linear or branched saturated hydrocarbon radicals having from 5 to 20 carbon atoms, while the term $C_1$-$C_4$ alkyl denominates a group of linear or branched saturated hydrocarbon radicals having from 1 to 4 carbon atoms. Examples of alkyl include but are not limited to methyl, ethyl, n-propyl, isopropyl, n-butyl, 2-butyl, 2-methylpropyl (isopropyl), 1,1-dimethylethyl (tert.-butyl), pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl, heneicosyl docosyl and their isomers. $C_1$-$C_4$-alkyl means for example methyl, ethyl, propyl, 1-methylethyl, butyl, 1-methylpropyl, 2-methylpropyl or 1,1-dimethylethyl.

Polymerization conditions are generally understood to mean those temperatures and pressures under which the free-radically initiated aqueous emulsion polymerization proceeds at sufficient polymerization rate. They depend particularly on the free-radical initiator used. Advantageously, the type and amount of the free-radical initiator, polymerization temperature and polymerization pressure are selected such that a sufficient amount of initiating radicals is always present to initiate or to maintain the polymerization reaction.

Here and throughout the specification, the term pphm (parts per hundred monomers) is used as a synonym for the relative amount of a certain monomer to the total amount of monomer composition M in % by weight. For example, x pphm monomer M2 means x % by weight of monomers M2, based on the total amount of monomers of the monomer composition M. An increase of y pphm means that the relative amount of a specific monomer is increased by y % by weight, based on the total weight of the monomers of the monomer composition M.

The present invention is characterized by a specific feed method, where during the feeding of the monomers M the level of monomers M2 in the monomer composition M, i.e. the relative amount of monomers M2 to the weight of the monomer composition M, which is fed to the polymerisation reaction, is increased to a higher level for one or more limited periods P(n) of time. After each of said periods the relative amount of said monomers M2 will be decreased. During each of the periods P(n), the relative amount of monomers M2 to the total amount of monomers which are fed during that period is at least one 1 pphm higher, in particular at least 2 pphm higher or at least 3 pphm higher than the level outside the periods. In particular, the level of monomers M2 fed during the periods P(n) is 1 to 85 pphm, in particular 2 to 80 pphm, more particularly 3 to 75 pphm, especially 4 to 67 pphm or 5 to 50 pphm higher than the average level of monomers M2, which is fed outside the periods P(n).

In the process of the invention there may be a single period P(n), during which the weight level of monomers M2 is increased. However, there may also be more than one period P(n). The total number of periods P(n) is not particularly limited and may be as high as 20 or even higher. For practical reasons the total number of periods P(n) will generally not exceed 10 and in particular be from 1 to 6.

The level of monomers M2 in the monomer composition M, which is fed outside the periods P(n), i.e. the level of monomers M2 before and after each period P(n), may be the same or it may slightly vary. The variation in the level of monomers M2 outside the periods P(n) will normally be not more than 1 pphm, in particular not more than 0.5 pphm. The values given here refer to the average values during the periods P(n) and outside the periods P(n).

The level of monomers M2 within the periods P(n) will usually be in the range from 3 pphm to 85 pphm, in particular from 4 pphm to 80 pphm, more particularly from 5 pphm to 75 pphm, especially 7.5 pphm to 67 pphm or from 10 to 50 pphm.

In terms of an aqueous emulsion polymerization, a feed method is understood as a method, where at least 95%, in particular at least 98% of the monomers to be polymerized are metered or fed to the polymerisation reaction under polymerisation conditions. In the context of the present invention, the monomers M are fed to the polymerisation reaction under polymerisation conditions during a certain period of time, hereinafter termed period P.

According to the invention, the period(s) P(n), where the level of the acidic monomers M2 is increased, are completely within said period P. It is important that the first period P(n) does not start before at least 10% of the monomers M, in particular at least 15% of the monomers M, which are subjected to the emulsion polymerization, have been metered into the polymerisation reaction. Likewise, it is important that the last of the periods P(n) will end, when at most 90%, in particular at most 85% of the monomers M, which are subjected to the emulsion polymerization, have been metered into the polymerisation reaction. In other words, the last of the periods P(n) does not end later than the point of time, when 90% or 85% of the monomers M, which are subjected to the emulsion polymerization, have been metered into the polymerisation reaction.

During said period(s) P(n) the weight ratio of the acidic monomers M2 to the total amount of the other monomers M1+M3 in the monomer composition, which is metered into the polymerization reaction, is frequently at least 0.03:1, in particular at least 0.04:1, more particularly at least 0.05:1, or at least 0.07:1 or at least 0.1:1, e.g. in the range from 0.03:1 to 5:1, in particular in the range from 0.04:1 to 4:1, more particularly in the range from 0.05:1 to 3:1, especially in the range from 0.07:1 to 3:2 or in the range from 0.1:1 to 1:1. Before each such period P(n) the ratio of the acidic monomers M2 to the total amount of the other monomers M1+M3 should be less than 0.05:1 in particular less than 0.03:1. Likewise, at the end of each period P(n), the ratio of the acidic monomers M2 to the total amount of the other monomers M1+M3 should be decreased to be less than 0.04:1 in particular less than 0.03:1.

The level of monomers M2 in the monomer composition and likewise the weight ratio of the acidic monomers M2 to the total amount of the other monomers M1+M3 in the monomer composition M, which is metered into the polymerization reaction, can be manipulated by well-known measures. For example, it may be possible to use a single feed line for metering the monomers M into the polymerization reaction. By increasing the concentration of the monomers M2 in the single feed line of monomers M or by lowering the total concentrations of monomers M1+M3 or by both measures the ratio of the acidic monomers M2 to the total amount of the other monomers M1+M3 can be increased.

Frequently and mostly for practical reasons at least a portion of the monomers M2, e.g. at least 20%, in particular at least 30%, e.g. from 20 to 100% or from 30 to 100% of the monomers M2 contained in the monomer composition M, may be metered to the polymerisation reaction via a separate feed line into the polymerization reaction. Frequently this separate feed is metered in parallel to the feed of the monomers M1+M3 and optionally the remainder of the monomers M2. In other words, monomers M1+M3 and optionally a portion of monomers M2, e.g. up to 80% or up to 70% of the total amount of monomers M2, are metered into the polymerization reaction as a first feed while the remaining portion of monomers M2, e.g. from 20 to 100% or from 30 to 100% of the total amount of monomers M2, are metered into the polymerization reaction as a second feed. By increasing the feeding rate of the second feed or by lowering the feeding rate of the first feed or by both measures the weight ratio of monomers M2 to monomers M1+M3 can be easily increased. Mostly for practical reasons one may start the second feed at the beginning of each period P(n) and interrupt the addition of the second feed at the end of each period P(n), which means that the feed-rate of the second feed is different from 0 only during the period(s) P(n). The first feed and the second feed may also be mixed, e.g. in an in-line mixer or by means of a mixing pump, before the combined feed is fed to the polymerisation vessel.

It is apparent that the total duration of all periods P(n) is shorter than the duration of the period P required for the metering of the total amount of monomers M into the polymerization reaction. Frequently, the total duration of all periods P(n) does not exceed 50%, in particular 40% and especially 30% of the duration of period P. Frequently, the total duration of all periods P(n) is at least 0.2%, in particular at least 0.5% and especially at least 1% of the duration of period P. In particular, the ratio of the total duration of all periods P(n) to the duration of the period P is from 0.002:1 to 0.3:1, especially from 0.005:1 to 0.25:1. Frequently, the total duration of all periods P(n) is from 30 seconds to 60 minutes, especially from 1 to 45 minutes. The duration of an individual period P(n) is of minor importance may be some seconds, e.g. 10 seconds and be up to 30 minutes or higher. Frequently, the duration of an individual period P(n) is from 10 seconds to 45 minutes and in particular from 30 seconds to 40 minutes. The duration of an period P may depend from the production equipment and may vary from e.g. 20 minutes to 12 h. Frequently, it will be in the range from 0.5 h to 5 h, especially from 1 h to 4 h.

Frequently, the total amount of monomers M2 contained in the monomer composition M may be added during the at least one period P(n) to the polymerisation reaction. However, it is not necessary to add the total amount of monomers M2 during the at least one period P(n), i.e. during all of the periods P(n). Frequently, at least 20% of the monomers M2 contained in the monomer composition M, in particular at least 30% or at least 40% of the monomers M2 contained in the monomer composition M are metered into the polymerization reaction during the at least one period P(n).

The relative amount of monomers M2 added during all of periods P(n) to the polymerisation reaction may be from 0.05 to 5% by weight, based on the total weight of the monomer composition M. Frequently, it is from 0.1 to 3% by weight, in particular form 0.2 to 2% by weight, based on the total weight of the monomer composition M.

The total amount of monomers M2 is preferably from 0.2 to 5% by weight, in particular form 0.5 to 4% by weight, based on the total weight of the monomer composition M. Consequently, the total amount of monomers M1+M3, if present, is generally from 95 to 99.95% by weight, in particular from 95 to 99.8% by weight and especially from 96 to 99.5% by weight, based on the total weight of the monomer composition M.

The total amount of monomers M1 is frequently from 80 to 99.95% by weight, in particular from 80 to 99.8% by weight and especially from 80 to 99.5% by weight, based on the total weight of the monomer composition M.

In a particular group of embodiments, the amount of monomers M3 is less than 10% by weight of the total weight of the monomer composition M, in particular less than 5% by weight, especially less than 3% by weight, based on the total weight of the monomer composition M. In this particular group of embodiments, the total amount of monomers M1 is frequently from 85 to 99.95% by weight, in particular from 90 to 99.8% by weight and especially from 93 to 99.5% by weight, based on the total weight of the monomer composition M.

In another particular group of embodiments, the amount of monomers M3 is from 0.1 to 19.95% by weight of the total weight of the monomer composition M, in particular from 1 to 19.8% by weight, especially from 5 to 19.5% by weight, based on the total weight of the monomer composition M. In this particular group of embodiments, the total amount of monomers M1 is frequently from 80 to 99.85% by weight, in particular from 80 to 98.8% by weight and especially from 80 to 94.5% by weight, based on the total weight of the monomer composition M.

According to the invention, the monomer composition M comprises as a monomer M1 a mixture of at least one monomer M1a and at least one monomer M1b.

Suitable monomers M1a are
$C_1$-$C_{20}$-alkyl esters of acrylic acid, such as methyl acrylate, ethyl acrylate, n-propyl acrylate, isopropyl-acrylate, n-butyl acrylate, 2-butyl acrylate, isobutyl acrylate, n-pentyl acrylate, n-hexyl acrylate, n-octyl acrylate, 2-ethylhexyl acrylate, n-decyl acrylate, 2-propylheptyl acrylate, lauryl acrylate, $C_{12}$/$C_{14}$-alkyl acrylate, and stearyl acrylate;
$C_5$-$C_{20}$-alkylesters of methacrylic acid, such as n-pentyl methacrylate, n-hexyl methacrylate, n-octyl methacrylate, 2-ethylhexyl methacrylate, n-decyl methacrylate, 2-propylheptyl methacrylate, lauryl methacrylate, $C_{12}$/$C_{14}$-alkyl methacrylate, and stearyl methacrylate;
and mixtures thereof.

Suitable monomers M1b are
$C_1$-$C_4$-alkyl esters of methacrylic acid, such as methyl methacrylate, ethyl methacrylate, n-propyl methacrylate, isopropyl methacrylate, n-butyl methacrylate, 2-butyl methacrylate, isobutyl methacrylate and tert.-butyl methacrylate, with particular preference given to methyl methacrylate;
vinylaromatic monomers, in particular mono-vinyl substituted aromatic hydrocarbons such as styrene, 2-methylstyrene, 4-methylstyrene, 2-n-butylstyrene, 4-n-butylstyrene, 4-n-decylstyrene and α-methylstyrene, with particular preference given to styrene;
and mixtures thereof.

Preferably, monomers M1a are selected from $C_2$-$C_{10}$-alkyl esters of acrylic acid, in particular from ethyl acrylate, n-butyl acrylate, n-hexyl acrylate, n-octyl acrylate, 2-ethylhexyl acrylate and 2-propylheptyl acrylate.

Preferably, monomers M1b are selected from vinylaromatic monomers and mixtures of at least one vinylaromatic monomer with at least one $C_1$-$C_4$-alkyl ester of methacrylic acid. In particular, monomers M1b are selected from styrene and mixtures of styrene with methyl methacrylate.

Examples of monomers M2 include, but are not limited to acrylic acid, methacrylic acid, crotonic acid, 2-ethylpropenoic acid, 2-propylpropenoic acid, itaconic acid and fumaric acid. Preference is given to monocarboxylic acids. Particular preference is given to acrylic acid, methacrylic acid and mixtures thereof. In a particular group of embodiments, the monomer M2 comprises methacrylic acid. Especially, the monomer M2 is methacrylic acid or a mixture of acrylic acid and methacrylic acid.

Examples of monomers M3 include, but are not limited to
- primary amides of monoethylenically unsaturated monocarboxylic acids having 3 to 8 carbon atoms (monomers M3.1), such as acrylamide and methacrylamide;
- N—$C_1$-$C_{10}$ alkyl amides of monoethylenically unsaturated monocarboxylic acids having 3 to 6 carbon atoms (monomers M3.2), in particular N—$C_1$-$C_{10}$ alkyl amides of acrylic acid or methacrylic acid, such as N-methyl acrylamide, N-ethyl acrylamide, N-propyl acrylamide, N-isopropyl acrylamide, N-butyl acrylamide, N-methyl methacrylamide, N-ethyl methacrylamide, N-propyl methacrylamide, N-isopropyl methacrylamide and N-butyl methacrylamide;
- monoethylenically unsaturated monomers bearing urea or keto groups (Monomers M3.3), such as 2-(2-oxo-imidazolidin-1-yl)ethyl (meth)acrylate, 2-ureido (meth) acrylate, N-[2-(2-oxooxazolidin-3-yl)ethyl] methacrylate, acetoacetoxyethyl acrylate, acetoacetoxypropyl methacrylate, acetoacetoxybutyl methacrylate, 2-(acetoacetoxy)ethyl methacrylate, diacetoneacrylamide (DAAM) and diacetonemethacrylamide;
- hydroxyalkyl esters of monoethylenically unsaturated $C_3$-$C_6$ monocarboxylic acids (monomers M3.4), especially hydroxyalkyl esters of acrylic acid and hydroxyalkyl esters of methacrylic acid, also referred to hereinafter as hydroxyalkyl (meth)acrylates, in particular hydroxy-$C_2$-$C_4$-alkylesters of acrylic acid and hydroxy-$C_2$-$C_4$-alkylesters of methacrylic acid, such as 2-hydroxyethyl acrylate, 3-hydroxypropyl acrylate, 4-hydroxybutyl acrylate, 2-hydroxyethyl methacrylate, 3-hydroxypropyl methacrylate, 4-hydroxybutyl methacrylate, etc.
- monoethylenically unsaturated monomers which bear at least one tri-$C_1$-$C_4$-alkoxysilane group (monomers M3.5), such as vinyl trimethoxysilane, vinyl triethoxysilane, methacryloxyethyl trimethoxysilane, methacryloxyethyl triethoxysilane, and mixtures thereof. The amount of said monomers M3.5 will frequently be in the range from 0.01 to 1 pphm.

Monomers M3 may also include a small amount of multiethylenically unsaturated monomers (monomers M3.6), i.e. monomers having at least 2 non-conjugated ethylenically unsaturated double bounds. The amounts of said monomers M3.5 will generally not exceed 1 pphm.

Examples of suitable monomers M3.6 include:
- Diesters of monoethylenically unsaturated $C_3$-$C_6$ monocarboxylic acids with saturated aliphatic or cycloaliphatic diols, in particular diesters of acrylic acid or methacrylic acid, such as the diacrylates and the dimethacrylates of ethylene glycol (1,2-ethanediol), propylene glycol (1,2-propanediol), 1,2-butanediol, 1,3-butanediol, 1,4-butanediol, neopentyl glycol (2,2-dimethyl-1,3-propanediol) or 1,2-cyclohexanediol;
- monoesters of monoethylenically unsaturated $C_3$-$C_6$ monocarboxylic acids with monoethylenically unsaturated aliphatic or cycloaliphatic monohydroxy compounds, such as the acrylates and the methacrylates of vinyl alcohol (ethenol), allyl alcohol (2-propen-1-ol), 2-cyclohexen-1-ol or norbornenol and
- divinyl aromatic compounds, such as 1,3-divinyl benzene, 1,4-divinyl benzene and mixtures thereof.

In a particular embodiment of the invention, the monomers M do not contain monomers M3.6 or not more than 0.1 pphm of monomers M3.6.

Amongst monomers M3, preference is given to hydroxyalkyl esters of acrylic acid and hydroxyalkyl esters of methacrylic acid, in particular to hydroxy-$C_2$-$C_4$-alkylesters of acrylic acid and hydroxy-$C_2$-$C_4$-alkylesters of methacrylic acid, and to mixtures thereof.

It has been found beneficial, if the monomer composition M contains at least one vinylaromatic monomer, in particular if it contains styrene. The amount of styrene may range from 2% by weight to 100% by weight, based on the weight of the monomers M1 b. In particular, at least 10% by weight, more particular at least 20% by weight especially at least 30% by weight or at least 50% by weight, based on the weight of the monomers M1b, are selected from vinylaromatic monomers, in particular from styrene. In particular, the monomer composition contains from 10 to 90% by weight of styrene, more particular 20 to 80% by weight of styrene, especially 30 to 75% by weight or 50 to 75% by weight of one or more vinylaromatic monomers, especially styrene, based on the total weight of the monomer composition M.

It has further been found beneficial, if the at least one vinylaromatic monomer is present in the monomers, which are metered to the polymerisation reaction, during the at least one period P(n).

Apart from that, the process of the present invention is performed by analogy to well-known processes of radical emulsion polymerisation technology. The conditions required for the performance of the free-radical emulsion polymerization of the monomers M are sufficiently familiar to those skilled in the art, for example from the prior art cited at the outset and from "Emulsionspolymerisation" [Emulsion Polymerization] in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer [Dispersions of Synthetic High Polymers], F. Hölscher, Springer-Verlag, Berlin (1969)].

The free-radically initiated aqueous emulsion polymerization is triggered by means of a free-radical polymerization initiator (free-radical initiator). These may in principle be peroxides or azo compounds. Of course, redox initiator systems are also useful. Peroxides used may, in principle, be inorganic peroxides, such as hydrogen peroxide or peroxodisulfates, such as the mono- or di-alkali metal or ammonium salts of peroxodisulfuric acid, for example the mono- and disodium, -potassium or ammonium salts, or organic peroxides such as alkyl hydroperoxides, for example tert-butyl hydroperoxide, p-menthyl hydroperoxide or cumyl hydroperoxide, and also dialkyl or diaryl peroxides, such as di-tert-butyl or di-cumyl peroxide. Azo compounds used are essentially 2,2'-azobis(isobutyronitrile), 2,2'-azobis(2,4-dimethylvaleronitrile) and 2,2'-azobis(amidinopropyl) dihydrochloride (AIBA, corresponds to V-50 from Wako Chemicals). Suitable oxidizing agents for redox initiator systems are essentially the peroxides specified above. Corresponding reducing agents which may be used are sulfur compounds with a low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of polyvalent metals, such as iron(II) sulfate, iron(II) ammonium sulfate, iron(II) phosphate, ene diols, such as dihydroxymaleic acid, benzoin and/or ascorbic acid, and reducing saccharides, such as sorbose, glucose, fructose and/or dihydroxyacetone.

Preferred free-radical initiators are inorganic peroxides, especially peroxodisulfates, and redox initiator systems.

In general, the amount of the free-radical initiator used, based on the total amount of monomers M, is 0.01 pphm to 5 pphm, preferably 0.1 pphm to 3 pphm.

The amount of free-radical initiator required in the process of the invention for the emulsion polymerization M can be initially charged in the polymerization vessel completely. However, it is also possible to charge none of or merely a portion of the free-radical initiator, e.g. not more than 30% by weight, especially not more than 20% by weight, based on the total amount of the free-radical initiator required in the aqueous polymerization medium and then, under polymerization conditions, during the free-radical emulsion polymerization of the monomers M to add the entire amount or any remaining residual amount, according to the consumption, batchwise in one or more portions or continuously with constant or varying flow rates.

More particularly, it has been found to be suitable to establish the polymerization conditions and to initially charge at least a portion of the free-radical initiator into the polymerisation vessel bevor the metering of the monomers M is started.

It has been found advantageous to perform the free-radical emulsion polymerization in the presence of a seed latex. A seed latex is a polymer latex which is present in the aqueous polymerization medium before the metering of the monomers M is started. The seed latex may help to better adjust the particle size or the final polymer latex obtained in the free-radical emulsion polymerization of the invention.

Principally every polymer latex may serve as a seed latex. For the purpose of the invention, preference is given to seed lattices, where the particle size of the polymer particles is comparatively small. In particular, the Z average particle diameter of the polymer particles of the seed latex, as determined by dynamic light scattering at 20° C. (see below) is preferably in the range from 10 to 80 nm, in particular form 10 to 50 nm. Preferably, the polymer particles of the seed latex is made of ethylenically unsaturated monomers, which comprise at least 95% by weight, based on the total weight of the monomers forming the seed latex, of one or more monomers M1a and/or M1b as defined above. In the polymer particles of the seed latex particular comprise at least 95% by weight, based on the total weight of the monomers forming the seed latex, of at least one monomer M1 b or of a mixture of at least one monomer M1b and one or more monomers M1a, where the proportion of monomers M1b to M1a is at least 50% on a weight basis.

For this, the seed latex is usually charged into the polymerisation vessel bevor the metering of the monomers M is started. In particular, the seed latex is charged into the polymerisation vessel followed by establishing the polymerization conditions and charging at least a portion of the free-radical initiator into the polymerisation vessel bevor the metering of the monomers M is started.

The amount of seed latex, calculated as solids, may frequently be in the range from 0.1 to 10% by weight, in particular from 0.5 to 5% by weight, based on the total weight of the monomers M to be polymerized.

The free-radical aqueous emulsion polymerization of the invention can be conducted at temperatures in the range from 0 to 170° C. Temperatures employed are generally in the range from 50 to 120° C., frequently 60 to 120° C. and often 70 to 110° C. The free-radical aqueous emulsion polymerization of the invention can be conducted at a pressure of less than, equal to or greater than 1 atm (atmospheric pressure), and so the polymerization temperature may exceed 100° C. and may be up to 170° C. Polymerization of the monomers is normally performed at ambient pressure but it may also be performed under elevated pressure. In this case, the pressure may assume values of 1.2, 1.5, 2, 5, 10, 15 bar (absolute) or even higher values. If emulsion polymerizations are conducted under reduced pressure, pressures of 950 mbar, frequently of 900 mbar and often 850 mbar (absolute) are established. Advantageously, the free-radical aqueous emulsion polymerization of the invention is conducted at ambient pressure (about 1 atm) with exclusion of oxygen, for example under an inert gas atmosphere, for example under nitrogen or argon.

The polymerization of the monomers M can optionally be conducted in the presence of chain transfer agents. Chain transfer agents are understood to mean compounds that transfer free radicals and which reduce the molecular weight of the or control chain growth in the polymerization. Examples of chain transfer agents are aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and the isomeric compounds thereof, n-octanethiol and the isomeric compounds thereof, n-nonanethiol and the isomeric compounds thereof, n-decanethiol and the isomeric compounds thereof, n-undecanethiol and the isomeric compounds thereof, n-dodecanethiol and the isomeric compounds thereof, n-tridecanethiol and isomeric compounds thereof, substituted thiols, for example 2-hydroxyethanethiol, aromatic thiols such as benzenethiol, ortho-, meta- or para-methylbenzenethiol, alkylesters of mercaptoacetic acid (thioglycolic acid) such as 2-ethylhexyl thioglycolate, alkylesters of mercaptopropionic acid such as octyl mercapto propionate, and also further sulfur compounds described in Polymer Handbook, 3rd edition, 1989, J. Brandrup and E. H. Immergut, John Wiley & Sons, section II, pages 133 to 141, but also aliphatic and/or aromatic aldehydes such as acetaldehyde, propionaldehyde and/or benzaldehyde, unsaturated fatty acids such as oleic acid, dienes having nonconjugated double bonds, such as divinylmethane or vinylcyclohexane, or hydrocarbons having readily abstractable hydrogen atoms, for example toluene. Alternatively, it is possible to use mixtures of the aforementioned chain transfer agents that do not disrupt one another. The total amount of chain transfer agents optionally used in the process of the invention, based on the total amount of monomers M, will generally not exceed 1% by weight.

The free-radical emulsion polymerization of the invention is usually effected in an aqueous polymerization medium, which, as well as water, comprises at least one surface-active substance (surfactant) for stabilizing the emulsion of the monomers and the polymer particles of the polymer latex.

The surfactant may be selected from emulsifiers and protective colloids. Protective colloids, as opposed to emulsifiers, are understood to mean polymeric compounds having molecular weights above 2000 Daltons, whereas emulsifiers typically have lower molecular weights. The surfactants may be anionic or nonionic or mixtures of non-ionic and anionic surfactants.

Anionic surfactants usually bear at least one anionic group, which is selected from phosphate, phosphonate, sulfate and sulfonate groups. The anionic surfactants, which bear at least one anionic group, are typically used in the form of their alkali metal salts, especially of their sodium salts or in the form of their ammonium salts.

Preferred anionic surfactants are anionic emulsifiers, in particular those, which bear at least one sulfate or sulfonate group. Likewise, anionic emulsifiers, which bear at least one phosphate or phosphonate group may be used, either as sole anionic emulsifiers or in combination with one or more anionic emulsifiers, which bear at least one sulfate or sulfonate group.

Examples of anionic emulsifies, which bear at least one sulfate or sulfonate group, are, for example, the salts, especially the alkali metal and ammonium salts, of alkyl sulfates, especially of $C_8$-$C_{22}$-alkyl sulfates, the salts, especially the alkali metal and ammonium salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40, the salts, especially the alkali metal and ammonium salts, of sulfuric monoesters of ethoxylated alkylphenols, especially of sulfuric monoesters of ethoxylated $C_4$-$C_{18}$-alkylphenols (EO level preferably 3 to 40), the salts, especially the alkali metal and ammonium salts, of alkylsulfonic acids, especially of $C_8$-$C_{22}$-alkylsulfonic acids, the salts, especially the alkali metal and ammonium salts, of dialkyl esters, especially di-$C_4$-$C_{18}$-alkyl esters of sulfosuccinic acid, the salts, especially the alkali metal and ammonium salts, of alkylbenzenesulfonic acids, especially of $C_4$-$C_{22}$-alkylbenzenesulfonic acids, and the salts, especially the alkali metal and ammonium salts, of mono- or disulfonated, alkyl-substituted diphenyl ethers, for example of bis(phenylsulfonic acid) ethers bearing a $C_4$-$C_{24}$-alkyl group on one or both aromatic rings. The latter are common knowledge, for example from U.S. Pat. No. 4,269,749, and are commercially available, for example as Dowfax® 2A1 (Dow Chemical Company).

Also suitable are mixtures of the aforementioned salts.

Preferred anionic surfactants are anionic emulsifiers, which are selected from the following groups:

the salts, especially the alkali metal and ammonium salts, of alkyl sulfates, especially of $C_8$-$C_{22}$-alkyl sulfates, the salts, especially the alkali metal salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40, of sulfuric monoesters of ethoxylated alkylphenols, especially of sulfuric monoesters of ethoxylated $C_4$-$C_{18}$-alkylphenols (EO level preferably 3 to 40), of alkylbenzenesulfonic acids, especially of $C_4$-$C_{22}$-alkylbenzenesulfonic acids, and of mono- or disulfonated, alkyl-substituted diphenyl ethers, for example of bis(phenylsulfonic acid) ethers bearing a $C_4$-$C_{24}$-alkyl group on one or both aromatic rings.

Examples of anionic emulsifies, which bear a phosphate or phosphonate group, include, but are not limited to the following salts are selected from the following groups:

the salts, especially the alkali metal and ammonium salts, of mono- and dialkyl phosphates, especially $C_8$-$C_{22}$-alkyl phosphates, the salts, especially the alkali metal and ammonium salts, of phosphoric monoesters of $C_2$-$C_3$-alkoxylated alkanols, preferably having an alkoxylation level in the range from 2 to 40, especially in the range from 3 to 30, for example phosphoric monoesters of ethoxylated $C_8$-$C_{22}$-alkanols, preferably having an ethoxylation level (EO level) in the range from 2 to 40, phosphoric monoesters of propoxylated $C_8$-$C_{22}$-alkanols, preferably having a propoxylation level (PO level) in the range from 2 to 40, and phosphoric monoesters of ethoxylated-co-propoxylated $C_8$-$C_{22}$-alkanols, preferably having an ethoxylation level (EO level) in the range from 1 to 20 and a propoxylation level of 1 to 20, the salts, especially the alkali metal and ammonium salts, of phosphoric monoesters of ethoxylated alkylphenols, especially phosphoric monoesters of ethoxylated $C_4$-$C_{18}$-alkylphenols (EO level preferably 3 to 40), the salts, especially the alkali metal and ammonium salts, of alkylphosphonic acids, especially $C_8$-$C_{22}$-alkylphosphonic acids and the salts, especially the alkali metal and ammonium salts, of alkylbenzenephosphonic acids, especially $C_4$-$C_{22}$-alkylbenzenephosphonic acids.

Further suitable anionic surfactants can be found in Houben-Weyl, Methoden der organischen Chemie [Methods of Organic Chemistry], volume XIV/1, Makromolekulare Stoffe [Macromolecular Substances], Georg-Thieme-Verlag, Stuttgart, 1961, p. 192-208.

Preferably, the surfactant comprises at least one anionic emulsifier, which bears at least one sulfate or sulfonate group. The at least one anionic emulsifier, which bears at least one sulfate or sulfonate group, may be the sole type of anionic emulsifiers. However, mixtures of at least one anionic emulsifier, which bears at least one sulfate or sulfonate group, and at least one anionic emulsifier, which bears at least one phosphate or phosphonate group, may also be used. In such mixtures, the amount of the at least one anionic emulsifier, which bears at least one sulfate or sulfonate group, is preferably at least 50% by weight, based on the total weight of anionic surfactants used in the process of the present invention. In particular, the amount of anionic emulsifiers, which bear at least one phosphate or phosphonate group does not exceed 20% by weight, based on the total weight of anionic surfactants used in the process of the present invention.

As well as the aforementioned anionic surfactants, the surfactant may also comprise one or more nonionic surface-active substances, which are especially selected from non-ionic emulsifiers. Suitable nonionic emulsifiers are e.g. araliphatic or aliphatic nonionic emulsifiers, for example ethoxylated mono-, di- and trialkylphenols (EO level: 3 to 50, alkyl radical: $C_4$-$C_{10}$), ethoxylates of long-chain alcohols (EO level: 3 to 100, alkyl radical: $C_8$-$C_{36}$), and polyethylene oxide/polypropylene oxide homo- and copolymers. These may comprise the alkylene oxide units copolymerized in random distribution or in the form of blocks. Very suitable examples are the EO/PO block copolymers. Preference is given to ethoxylates of long-chain alkanols (alkyl radical $C_1$-$C_{30}$, mean ethoxylation level 5 to 100) and, among these, particular preference to those having a linear $C_{12}$-$C_{20}$ alkyl radical and a mean ethoxylation level of 10 to 50, and also to ethoxylated monoalkylphenols.

In a particular embodiment of the invention, the surfactants used in the process of the present invention comprise less than 20% by weight, especially not more than 10% by weight, of nonionic surfactants, based on the total amount of surfactants used in the process of the present invention, and especially do not comprise any nonionic surfactant. In another embodiment of the invention, the surfactants used in the process of the present invention comprise at least one anionic surfactant and at least one non-ionic surfactant, the ratio of anionic surfactants to non-ionic surfactants being usually in the range form 0.5:1 to 10:1, in particular from 1:1 to 5:1.

Preferably, the surfactant will be used in such an amount that the amount of surfactant is in the range from 0.2% to 5% by weight, especially in the range from 0.5% to 3% by weight, based on the monomers M to be polymerized.

The aqueous reaction medium in polymerization may in principle also comprise minor amounts (≤5% by weight) of water-soluble organic solvents, for example methanol, ethanol, isopropanol, butanols, pentanols, but also acetone, etc. Preferably, however, the process of the invention is conducted in the absence of such solvents.

It is frequently advantageous when the aqueous polymer dispersion obtained on completion of polymerization of the monomers M is subjected to an after-treatment to reduce the residual monomer content. This after-treatment is effected either chemically, for example by completing the polymerization reaction using a more effective free-radical initiator system (known as postpolymerization), and/or physically, for example by stripping the aqueous polymer dispersion with steam or inert gas. Corresponding chemical and physical methods are familiar to those skilled in the art—see, for example, EP-A 771328, DE-A 19624299, DE-A 19621027, DE-A 19741184, DE-A 19741187, DE-A 19805122, DE-A 19828183, DE-A 19839199, DE-A 19840586 and DE-A 19847115. The combination of chemical and physical after-treatment has the advantage that it removes not only the unconverted ethylenically unsaturated monomers but also other disruptive volatile organic constituents (VOCs) from the aqueous polymer dispersion.

The polymer latex obtainable by the process of the invention is characterized by showing a characteristic swelling behavior in alkaline aqueous media, i.e. the polymer particles of the latex swell to a certain degree but do not dissolve in alkaline aqueous media. The swelling degree can be determined by determining the Z average particle diameter of a aqueous dilution of the latex at pH 8 and 22° C. and compare with the Z average particle diameter of an aqueous dilution of the latex at pH 12 and 22° C., where the polymer concentration of the probe having pH 8 and of the probe having pH 12 are the same, e.g. 0.01% by weight, usually also ensuring the same concentration (e.g. 0.1% by weight) of non-ionic emulsifier, e.g. an ethoxylated C16/C18 alkanol (degree of ethoxylation of 18), as described below. In other words, the swelling degree is the ratio of the Z average particle diameter determined at pH 12 to the Z average particle diameter determined at pH 8.

The average particle diameter as referred herein relates to the Z average particle diameter as determined by means of photon correlation spectroscopy (PCS), also known as quasielastic light scattering (QELS) or dynamic light scattering (DLS). The measurement method is described in the ISO 13321:1996 standard. The determination can be carried out using an HPPS (High Performance Particle Sizer). For this purpose, a sample of the aqueous polymer dispersion will be diluted and the dilution will be analysed. In the context of DLS, the aqueous dilution may have a polymer concentration in the range from 0.001 to 0.5% by weight, depending on the particle size. For most purposes, a proper concentration will be 0.01% by weight. However, higher or lower concentrations may be used to achieve an optimum signal/noise ratio. The dilution can be achieved by addition of the polymer dispersion to water or an aqueous solution of a surfactant in order to avoid flocculation. Usually, dilution is performed by using a 0.1% by weight aqueous solution of a non-ionic emulsifier, e.g. an ethoxylated C16/C18 alkanol (degree of ethoxylation of 18), as a diluent. Measurement configuration: HPPS from Malvern, automated, with continuous-flow cuvette and Gilson autosampler. Parameters: measurement temperature 22.0° C.; measurement time 120 seconds (6 cycles each of 20 s); scattering angle 173°; wavelength laser 633 nm (HeNe); refractive index of medium 1.332 (aqueous); viscosity 0.9546 mPa·s. The measurement gives an average value of the cumulant analysis (mean of fits), i.e. Z average. The "mean of fits" is an average, intensity-weighted particle diameter in nm, which corresponds to the volume-average or mass-average particle diameter.

The swelling degree, i.e. the ratio of the Z average particle diameter at pH 12 and 22° C. to the Z average particle diameter at pH 8 and 20° C., will generally not exceed a value of 2.0 in particular 1.8. This swelling ratio is frequently at least 1.2 (swelling of 20%), preferably at least 1.25 (swelling of 25%) especially at least 1.3 (swelling of 30%). In particular the swelling degree is in the range of 1.2 to 1.8, especially in the range of 1.3 to 1.7, as determined by dynamic light scattering of a 0.001 to 0.5% by weight aqueous dilution of the latex at the respective pH.

The polymer particles of the aqueous polymer latex obtainable by the process of the invention frequently have a Z average particle diameter of at most 500 nm, in particular of at most 300 nm, e.g. in the range from 50 to 500 nm, in particular in the range from 70 to 300 nm and especially in the range from 80 to 250 nm, as determined by dynamic light scattering of an aqueous dilution of the latex at pH 8 and 22° C.

It is apparent, that the average composition of the polymer particles of the polymer latex obtainable by the process of the invention is essentially the same as the composition of the monomers M, i.e. the polymer latex contains the monomers M in polymerized form in the relative amounts given for the monomer composition M.

The polymer contained in the polymer latex usually shows a glass transition. For the purpose of the invention, the glass transition temperature is preferably in the range from −20° C. to +90° C., in particular from 0 to 85° C. and especially in the range from 10 to 85° C. The glass transition temperature refers to the glass transition temperature as determined by the DSC method (differential scanning calorimetry) according to DIN 53765:1994-03 or ISO 11357-2, midpoint temperature, at a heating rate of 20K/min and with sample preparation preferably to DIN EN ISO 16805:2005.

The glass transition temperature of the polymer latex particles is governed by the monomer composition and thus by composition of the monomers M to be polymerized. Therefore, by choosing proper amounts of monomers M1, M2 and M3 the glass transition temperature of the polymer can be adjusted. According to Fox (T. G. Fox, Bull. Am. Phys. Soc. 1956 [Ser. II] 1, page 123) and according to Ullmann's Encyclopadie der technischen Chemie [Ullmann's Encyclopedia of Industrial Chemistry] (vol. 19, page 18, 4th edition, Verlag Chemie, Weinheim, 1980), the following is a good approximation of the glass transition temperature of no more than lightly crosslinked copolymers:

$$1/Tg = x_1/Tg_1 + x_2/Tg_2 + \ldots x_n/Tg_n,$$

where $x_1, x_2, \ldots x_n$ are the mass fractions of the monomers 1, 2, ... n and $Tg_1, Tg_2, \ldots T_gn$ are the glass transition temperatures in degrees Kelvin of the polymers synthesized from only one of the monomers 1, 2, ... n at a time. The Tg values for the homopolymers of most monomers are known and listed, for example, in Ullmann's Encyclopedia of Industrial Chemistry, 5th ed., vol. A21, page 169, Verlag Chemie, Weinheim, 1992; further sources of glass transition temperatures of homopolymers are, for example, J. Brandrup, E. H. Immergut, Polymer Handbook, 1st Ed., J. Wiley, New York 1966, 2nd Ed. J. Wiley, New York 1975, and 3rd Ed. J. Wiley, New York 1989.

The aqueous polymer dispersions obtained in accordance with the invention typically have polymer solids contents in the range from 10% to 70% by weight, frequently 20% to 65% by weight and often 30% to 60% by weight, based in each case on the total weight of the aqueous polymer dispersion.

As outlined above, the polymer latex of the present invention can be used in water-borne coating compositions as a binder or co-binder and a titanium dioxide pigment. The polymer may be used as the sole binder or it may be combined with a conventional binder, conventionally used in aqueous coating compositions containing a titanium dioxide pigment.

Conventional binders may be any binders, which are conventionally used in aqueous coating compositions. Suitable binders include but are not limited to polymer lattices, in particular polymer lattices based on the aforementioned monomers M1, in particular styrene-acrylic lattices and all-acrylic lattices, lattices based on vinyl acetate, polyurethane dispersions, polyester dispersions, and the like. Suitable binders may also be acid curable binders such as aldehyde binders, e.g. the Laropal® grades of BASF SE and amino resins, in particular etherified melamine formaldehyde binders, such as the Luwipal® grades of BASF, etherified urea formaldehyde binders, such as the Plastopal® grades of BASF, thermally curable binders, e.g. binders having blocked isocyanate groups, carbodiimide groups and/or epoxide groups, or aqueous UV curable binders. The type of binder will essentially depend on the intended use and a skilled person will readily appreciate which conventional binder can be used to achieve the desired purpose.

As outlined above, the aqueous polymer latex of the invention is capable of spontaneously forming a particulate polymer composite material with titanium dioxide pigments. In this polymer composite material the particles of the polymer latex and the particles of the titanium dioxide pigment form composite particles containing both the polymer particles of the latex and the particles of the titanium dioxide pigment. It is believed that in the composite particles polymer particles of the latex are adsorbed to the surface of the particles of the titanium dioxide pigment. These particles are dispersed in the aqueous phase of the latex and thus form an aqueous dispersion containing polymer composite particles of titanium dioxide particles and polymer particles of the aqueous polymer latex as described herein.

The aqueous dispersion of the polymer composite can be simply prepared by mixing $TiO_2$ pigment powder or an aqueous slurry or paste of $TiO_2$ pigment with the aqueous polymer latex of the invention, preferably by applying shear to the mixture, e.g. by using a dissolver conventionally used for preparing water-borne paints. It will also be possible to prepare an aqueous slurry or paste of $TiO_2$ pigment and the aqueous polymer latex of the invention, which is then incorporated into or mixed with further polymer latex of the invention or with any other polymer latex binder.

The aqueous dispersion of the polymer composite may also be prepared by incorporating the aqueous polymer latex of the invention as a binder or co-binder in an aqueous base formulation of a paint, which already contains a $TiO_2$ pigment, e.g. by mixing the aqueous polymer latex of the invention with a pigment formulation that already contains further additives conventionally used in the paint formulation.

In order to stabilize the $TiO_2$ pigment particles in the aqueous pigment slurry or paste, the mixing may optionally be performed in the presence of additives conventionally used in aqueous pigment slurries or pigment pastes, such as dispersants. Suitable dispersants include but are not limited to, for example, polyphosphates such as sodium polyphosphates, potassium polyphosphates or ammonium polyphosphates, alkali metal salts and ammonium salts of acrylic acid copolymers or maleic anhydride copolymers, polyphosphonates, such as sodium 1-hydroxyethane-1,1-diphosphonate, and naphthalenesulfonic salts, especially the sodium salts thereof.

The mixing can be performed at a temperature e.g. in the range from 10 to 60° C., and is frequently performed at ambient temperature, e.g. in the range from 15 to 35° C.

The polymer concentration in aqueous polymer latex used for preparing the aqueous dispersion of the polymer composite will generally be in the range from 10% to 70% by weight, frequently 20% to 65% by weight and often 30% to 60% by weight, based in each case on the total weight of the aqueous polymer latex. The $TiO_2$ concentration in aqueous $TiO_2$ pigment slurry or paste used for preparing the aqueous dispersion of the polymer composite will generally be in the range from 30% to 85% by weight, frequently 40% to 80% by weight and often 50% to 75% by weight, based in each case on the total weight of the aqueous $TiO_2$ pigment slurry or paste.

The titanium dioxide pigment used for preparing the aqueous dispersion of the polymer composite may any $TiO_2$ pigment conventionally used in coating compositions, in particular in aqueous coating compositions. Frequently, a $TiO_2$ pigment is used wherein the $TiO_2$ particles are preferably in the rutile form.

Preferably, the aqueous polymer latex and the aqueous $TiO_2$ pigment slurry or paste or the base formulation are used in such amounts that the ratio of polymer to titanium dioxide is in the range from 0.1:1 to 5:1, in particular from 0.2:1 to 5:1 and especially from 0.5:1 to 5:1 or from 0.8:1 to 5:1.

Preferably the mixing is performed at a pH in the range from pH 6 to pH 10.

The formation of the composite particles may require a certain time, depending on the shear applied, the temperature and the relative concentrations of $TiO_2$ and polymer. However, a skilled person can easily find the proper conditions by routine.

The invention also relates to aqueous coating compositions containing the aqueous polymer latex of the present invention and a titanium dioxide pigment.

In the aqueous coating compositions (aqueous paints) the polymer latex of present invention may act as a binder or as co-binder, i.e. the polymer latex may provide the sole binding polymer in the coating composition or the coating composition may contain one or more further polymers, which act as a binder, i.e. polymers, which are conventionally used as binders in aqueous coating compositions, e.g. the conventional binders mentioned above.

In addition to the polymer latex of the present invention and a titanium dioxide pigment and the optional conventional binder, the aqueous coating compositions may contain one or more pigments different from the $TiO_2$ pigment and/or fillers.

Suitable pigments different from the $TiO_2$ pigment are, for example, inorganic white pigments such as barium sulfate, zinc oxide, zinc sulfide, basic lead carbonate, antimony trioxide, lithopone (zinc sulfide+barium sulfate), or colored pigments, for example iron oxides, carbon black, graphite, zinc yellow, zinc green, ultramarine, manganese black, antimony black, manganese violet, Prussian blue or Paris green. In addition to the inorganic pigments, the emulsion paints of the invention may also comprise organic color pigments, for example sepia, gamboge, Cassel brown, toluidine red, para red, Hansa yellow, indigo, azo dyes, anthraquinonoid and indigoid dyes, and also dioxazine, quinacridone pigments, phthalocyanine pigments, isoindolinone pigments and metal complex pigments. Also suitable are synthetic white pigments with air inclusions to enhance light scattering, such as the Ropaque® and AQACell® dispersions. Additionally suitable are the Luconyl® brands from BASF SE, for example Luconyl® yellow, Luconyl® brown and Luconyl® red, particularly the transparent versions.

Examples of suitable fillers are aluminosilicates such as feldspars, silicates such as kaolin, talc, mica, magnesite, alkaline earth metal carbonates such as calcium carbonate, for example in the form of calcite or chalk, magnesium carbonate, dolomite, alkaline earth metal sulfates such as calcium sulfate, silicon dioxide, etc. In the coating compositions of the invention, finely divided fillers are naturally preferred. The fillers may be used in the form of individual components. In practice, however, filler mixtures have been found to be particularly useful, for example calcium carbonate/kaolin, calcium carbonate/talc. Gloss paints generally comprise only small amounts of very finely divided fillers, or do not comprise any fillers. Fillers also include flatting agents which significantly impair the gloss as desired. Flatting agents are generally transparent and may be either organic or inorganic. Examples of flatting agents are inorganic silicates, for example the Syloid® brands from W. R. Grace & Company and the Acematt® brands from Evonik GmbH. Organic flatting agents are obtainable, for example, from BYK-Chemie GmbH under the Ceraflour® brands and the Ceramat® brands, and from Deuteron GmbH under the Deuteron MK® brand.

The proportion of the pigments and fillers in coating compositions can be described in a manner known per se via the pigment volume concentration (PVC). The PVC describes the ratio of the volume of pigments ($V_P$) and fillers ($V_F$) relative to the total volume, consisting of the volumes of binder ($V_B$), pigments ($V_P$) and fillers ($V_F$) in a dried coating film in percent: $PVC=(V_P+V_F) \times 100/(V_P+V_F+V_B)$.

The inventive effects of the polymer dispersion are especially manifested in the case of pigment-containing paints having a PVC of at least 5, especially at least 10. Preferably, the PVC will not exceed a value of 60, especially 30, and is specifically in the range from 5 to 60 or 5 to 30. However, the inventive effects of the polymer dispersions are also manifested in varnishes which typically have a pigment/filler content below 5% by weight, based on the varnish, and correspondingly have a PVC below 5.

In preferred configurations, the coating compositions of the invention comprise titanium dioxide, preferably in the rutile form, in combination with one or more fillers, for example chalk, talc or mixtures thereof.

The aqueous coating compositions (aqueous paints) of the invention may also comprise customary auxiliaries. The customary auxiliaries will depend from the kind of the coating and the binder in a well-known manner and include but are not limited to:

wetting agents or dispersants,
filming auxiliaries,
thickeners,
leveling agents,
biocides and
defoamers,
curing catalysts.

Wetting agents or dispersants are, for example, sodium polyphosphates, potassium polyphosphates or ammonium polyphosphates, alkali metal salts and ammonium salts of acrylic acid copolymers or maleic anhydride copolymers, polyphosphonates, such as sodium 1-hydroxyethane-1,1-diphosphonate, and naphthalenesulfonic salts, especially the sodium salts thereof.

Suitable filming auxiliaries are, for example, Texanol® from Eastman Chemicals and the glycol ethers and esters, commercially available, for example, from BASF SE under the Solvenon® and Lusolvan® names, and from Dow under the Dowanol® trade name. The amount is preferably <10% by weight and more preferably <5% by weight, based on the overall formulation. Formulation is also possible completely without solvents.

Suitable thickeners are, for example, associative thickeners, such as polyurethane thickeners. The amount of the thickener is generally less than 2.5% by weight and more preferably less than 1.5% by weight of thickener, and especially 0.05% to 1% by weight, based on the solids content of the coating composition.

Curing catalysts may be included, if the coating compositions contains a curable binder, e.g. an acid curable binder, a thermally curable binder or a photocurable binder as described above. Suitable curing catalysts will depend on the kind of binder used and include in particular Brönstedt acids, metal salts, quaternary ammonium salts and photoinitiators.

Further formulation ingredients for water-borne paints are described in detail in M. Schwartz and R. Baumstark "Water-based Acrylates for Decorative Coatings", Curt R. Vincentz Verlag, Hanover, 2001, p. 191-212 (ISBN 3-87870-726-6).

The coating compositions are produced in a manner known per se by blending the components in mixing apparatuses customary for the purpose. It has been found to be useful to prepare an aqueous slurry of the $TiO_2$ pigment, and optionally further pigments and/or fillers, water and any auxiliaries and only then to mix the aqueous polymer latex with the pigment paste or pigment dispersion. It has also been found to be useful to prepare an aqueous slurry or paste of the $TiO_2$ pigment and at least a portion of the polymer latex of the invention and optionally further pigments and/or fillers, water and optionally auxiliaries and then to mix the thus obtained slurry or paste with further aqueous polymer latex and optionally further auxiliaries.

The coating compositions may be applied to substrates in a customary manner, for example by painting, spraying, dipping, rolling, bar coating.

In this case, the coating of substrates is effected in such a way that the substrate is first coated with an aqueous coating formulation of the invention and then the aqueous coating is subjected to a drying step, especially within the temperature range of ≥−10 and ≤50° C., advantageously ≥5 and ≤40° C. and especially advantageously ≥10 and ≤35° C. Eventually, a curing step may be performed afterwards, if the coating composition contains a curable binder.

The invention is to be illustrated by non-limiting examples which follow.

EXAMPLES

1. Analysis

The solids content was determined by drying a defined amount of the aqueous polymer dispersion (about 2 g) to constant weight in an aluminum crucible having an internal diameter of about 5 cm at 120° C. in a drying cabinet (about 2 hours). Two separate measurements were conducted. The value reported in the example is the mean of the two measurements.

The particle diameter of the polymer latex was determined by dynamic light scattering of an aqueous polymer dispersion diluted with deionized water to 0.001 to 0.5% by weight at 22° C. by means of a High Performance Particle Sizer (HPPS) from Malvern Instruments, England. What is reported is the cumulant Z average diameter calculated from the measured autocorrelation function (ISO Standard 13321).

The glass transition temperature was determined by the DSC method (Differential Scanning Calorimetry, 20 K/min, midpoint measurement, DIN 53765:1994-03) by means of a DSC instrument (Q 2000 series from TA instruments).

2. Starting Materials

Emulsifier solution 1: 15% by weight aqueous solution of sodium dodecylsulfate

Seed latex: 33% by weight aqueous polystyrene latex having an average particle size in the range of 10-50 nm A Preparation of the polymer latex Comparative Example 1 (Dispersion CD1)

A polymerization vessel equipped with metering units and closed-loop temperature control was initially charged at 20 to 25° C. (room temperature) under a nitrogen atmosphere with 153.9 g of deionized water and 26.5 g of the seed latex, and heated to 90° C. while stirring. On attainment of this temperature, 2.6 g of feed 2 were added and the mixture was stirred at 90° C. for further 5 min. Then, while maintaining the temperature, simultaneously feed 1 and the remainder of feed 2 were started. Feed 1 was metered at constant feed rate into the reaction within 150 min. and feed 2 was metered at constant feed rate into the reaction vessel within 165 min., while stirring was continued and the temperature of 90° C. was maintained. After having metered 16.7% of feed 1 (116.2 g), feed 1A was started and metered in parallel to feed 1 into the reaction vessel within 125 min. After having metered feed 2 completely into the reaction vessel, stirring at 90° C. was continued for 15 min. Then, feed 3 was added and stirring at 90° C. was continued for 5 min. Then, feed 4 and feed 5 were started simultaneously and metered into the reaction vessel within 90 minutes while maintaining the temperature of 90° C. Thereafter feed 6 was added followed by the addition of 27.5 g of water. The obtained polymer latex was cooled to ambient temperature and filtered through a 125 μm filter. Thereby, 996.6 g of an aqueous polymer latex was obtained, which had a solid content of 50.5% and a pH of 7.9. The aqueous polymer dispersion diluted with deionized water had a median particle diameter of 114 nm, determined by means of dynamic light scattering. The particle diameter of the diluted aqueous polymer dispersion at pH 12 was 132 nm.

Feed 1 (Emulsion of):

| 170.2 g | deionized water |
| 33.3 g | emulsifier solution 1 |
| 12.5 g | acrylic acid |
| 240.0 g | styrene and |
| 240.0 g | n-butyl acrylate |

Feed 1A (Aqueous Solution of):

| 7.5 g | methacrylic acid |
| 22.5 g | deionized water |

Feed 2 (Homogeneous Solution of):

| 33.2 g | deionized water and |
| 2.5 g | sodium peroxodisulfate |

Feed 3

| 8.0 g | 25% by weight aqueous solution of ammonia |

Feed 4

| 7.5 g | 10% by weight aqueous solution of tert-butyl hydroperoxide |

Feed 5

| 9.5 g | 13.1% by weight aqueous solution of sodium acetone bisulfite |

Feed 6

| 2.0 g | 25% by weight aqueous solution of ammonia |

Example 1 (Dispersion D1)

The polymerization was performed by the protocol of comparative example 1, except for the following: After having metered 16.7% of feed 1 (116.2 g) into the reaction vessel, feed 1A was started and metered into the reaction vessel within 1 min.

Thereby, about 990 g of an aqueous polymer latex was obtained, which had a solid content of 51.2% and a pH of 7.8. The aqueous polymer dispersion diluted with deionized water had a particle diameter of 115 nm, determined by means of dynamic light scattering. The particle diameter of the diluted aqueous polymer dispersion at pH 12 was 192 nm.

Example 2 (Dispersion D2)

The polymerization was performed by the protocol of comparative example 1, except for the following: After having metered 16.7% of feed 1 (116.2 g) into the reaction vessel, feed 1A was started and metered into the reaction vessel within 5 min.

Thereby, about 990 g of an aqueous polymer latex was obtained, which had a solid content of 50.7% and a pH of 7.9. The aqueous polymer dispersion diluted with deionized water had a particle diameter of 113 nm, determined by means of dynamic light scattering. The particle diameter of the diluted aqueous polymer dispersion at pH 12 was 186 nm.

Example 3 (Dispersion D3)

The polymerization was performed by the protocol of comparative example 1, except for the following: After having metered 16.7% of feed 1 (116.2 g) into the reaction vessel, 50% of feed 1A was metered into the reaction vessel within 3 min. After having metered 28.7% of feed 1 into the reaction vessel, the remainder of feed 1A was metered into the reaction vessel within 2 min.

Thereby about 990 g of an aqueous polymer latex was obtained, which had a solid content of 50.8% and a pH of 8.2. The aqueous polymer dispersion diluted with deionized water had a particle diameter of 113 nm, determined by means of dynamic light scattering. The particle diameter of the diluted aqueous polymer dispersion at pH 12 was 178 nm.

Example 4 (Dispersion D4)

The polymerization was performed by the protocol of comparative example 1, except for the following: After having metered 16.7% of feed 1 (116.2 g) into the reaction vessel, one third of feed 1A was metered into the reaction vessel within 2 min. After having metered 28.7% of feed 1 into the reaction vessel, one further third of feed 1A was metered into the reaction vessel within 2 min. After having metered 40% of feed 1 into the reaction vessel, the last third of feed 1A was metered into the reaction vessel within 1 min.

Thereby, about 990 g of an aqueous polymer latex was obtained, which had a solid content of 51.6% and a pH of 8.1. The aqueous polymer dispersion diluted with deionized water had a particle diameter of 112 nm, determined by means of dynamic light scattering. The particle diameter of the diluted aqueous polymer dispersion at pH 12 was 169 nm.

Example 5 (Dispersion D5)

The polymerization was performed by the protocol of comparative example 1, except for the following: After having metered 16.7% of feed 1 (116.2 g) into the reaction vessel, 25% of feed 1A were metered into the reaction vessel within 2 min. After having metered 28.7% of feed 1 into the reaction vessel, further 25% of feed 1A were metered into the reaction vessel within 1 min. After having metered 40% of feed 1 into the reaction vessel, further 25% of feed 1A were metered into the reaction vessel within 1 min. After having metered 50.7% of feed 1 into the reaction vessel, further 25% of feed 1A were metered into the reaction vessel within 1 min.

Thereby, about 990 g of an aqueous polymer latex was obtained, which had a solid content of 50.4% and a pH of 8.2. The aqueous polymer dispersion diluted with deionized water had a particle diameter of 111 nm, determined by means of dynamic light scattering. The particle diameter of the diluted aqueous polymer dispersion at pH 12 was 165 nm.

Example 6 (Dispersion D6)

The polymerization was performed by the protocol of comparative example 1, except for the following: After having metered 16.7% of feed 1 (116.2 g) into the reaction vessel, 20% of feed 1A were metered into the reaction vessel within 1 min. After having metered 28.7% of feed 1 into the reaction vessel, further 20% of feed 1A were metered into the reaction vessel within 1 min. After having metered 40% of feed 1 into the reaction vessel, further 20% of feed 1A were metered into the reaction vessel within 1 min. After having metered 50.7% of feed 1 into the reaction vessel, further 20% of feed 1A were metered into the reaction vessel within 1 min. After having metered 61.3% of feed 1 into the reaction vessel, further 20% of feed 1A were metered into the reaction vessel within 1 min.

Thereby, about 990 g of an aqueous polymer latex was obtained, which had a solid content of 52.2% and a pH of 8.2. The aqueous polymer dispersion diluted with deionized water had a particle diameter of 111 nm, determined by means of dynamic light scattering. The particle diameter of the diluted aqueous polymer dispersion at pH 12 was 158 nm.

Example 7 (Dispersion D7)

A polymerization vessel equipped with metering units and closed-loop temperature control was initially charged at 20 to 25° C. (room temperature) under a nitrogen atmosphere with 368.7 g of deionized water, 2.5 g of 25% by weight aqueous ammonia and 37.2 g of the seed latex, and heated to 85° C. while stirring. On attainment of this temperature, 43.8 g of a 7% by weight aqueous solution of sodium peroxodisulfate was added and the mixture was stirred at 85° C. for further 5 min. Then, while maintaining the temperature, feed 1 was started and metered at constant feed rate into the reaction within 120 min., while stirring was continued and the temperature of 85° C. was maintained. After having metered 16.7% of feed 1, feed 1A was started and metered into the reaction vessel within 3 min. After having metered feed 1 completely into the reaction vessel, 30.2 g of water were added and stirring at 85° C. was continued for 30 min. Then, feed 2 and feed 3 were started simultaneously and metered into the reaction vessel within 60 minutes while maintaining the temperature of 85° C.

Thereafter 24.4 g of water were added. The obtained polymer latex was cooled to ambient temperature, 1.23 g of aqueous biocide were added and the latex was filtered through a 125 μm filter.

Feed 1 (Emulsion of):

| | |
|---|---|
| 181.5 g | deionized water |
| 81.9 g | emulsifier solution 1 |
| 98.3 g | 2-hydroxyethyl acrylate |
| 73.6 g | methyl methacrylate |
| 357.9 g | styrene and |
| 79.9 g | n-butyl acrylate |

Feed 1A (Aqueous Solution of):

| 4.3 g | methacrylic acid |
|---|---|
| 12.9 g | deionized water |

Feed 2

| 6.1 g | 10% by weight aqueous solution of tert. butyl hydroperoxide |
|---|---|

Feed 3

| 7.0 g | 13.1% by weight aqueous solution of sodium acetone bisulfite |
|---|---|

Thereby, about 1400 g of an aqueous polymer latex was obtained, which had a solid content of 45.9% and a pH of 2.6. The aqueous polymer dispersion diluted with deionized water had a particle diameter of 116 nm, determined by means of dynamic light scattering.

Example 8 (Dispersion D8)

The polymerization was performed by the protocol of example 7, except for the following:
The polymerization vessel was initially charged with 356.0 g of deionized water, 2.5 g of 25% by weight aqueous ammonia and 37.2 g of the seed latex.
After having metered 16.7% of feed 1 (116.2 g) into the reaction vessel, feed 1A was started and metered into the reaction vessel within 5 min.
Feed 1 and feed 1A had the following compositions:
Feed 1 (Emulsion of):

| 179.5 g | deionized water |
|---|---|
| 81.9 g | emulsifier solution 1 |
| 98.3 g | 2-hydroxyethyl acrylate |
| 73.6 g | methyl methacrylate |
| 353.0 g | styrene and |
| 79.9 g | n-butyl acrylate |

Feed 1A (Aqueous Solution of):

| 9.2 g | methacrylic acid |
|---|---|
| 27.6 g | deionized water |

Thereby, about 1400 g of an aqueous polymer latex was obtained, which had a solid content of 45.9% and a pH of 2.6. The aqueous polymer dispersion diluted with deionized water had a particle diameter of 117 nm, determined by means of dynamic light scattering.

Comparative Example 2 (dispersion CD2)

The polymerization was performed by the protocol of example 7, except for the following. Feed 1 and feed 1A were combined to a single feed and metered into the polymerization reaction within 120 min.
Thereby, about 1400 g of an aqueous polymer latex was obtained, which had a solid content of 45.9% and a pH of 2.6. The aqueous polymer dispersion diluted with deionized water had a particle diameter of 115 nm, determined by means of dynamic light scattering.

Comparative Example 3 (dispersion CD3)

A polymerization vessel equipped with metering units and closed-loop temperature control was initially charged at 20 to 25° C. (room temperature) under a nitrogen atmosphere with 156.4 g of deionized water and 9.1 g of the seed latex, and heated to 90° C. while stirring. On attainment of this temperature, 2.6 g of feed 2 were added and the mixture was stirred at 90° C. for further 5 min. Then, while maintaining the temperature, simultaneously feed 1, feed 1A and feed 1B and the remainder of feed 2 were started and metered at constant feed rate into the reaction vessel within 120 min., while stirring was continued and the temperature of 90° C. was maintained. After having metered the feeds completely into the reaction vessel, stirring at 90° C. was continued for 20 min. Then, feeds 3 and 4 were started simultaneously and metered into the reaction vessel within 60 minutes while maintaining the temperature of 90° C. The obtained polymer latex was cooled to ambient temperature and filtered through a 125 µm filter. Thereby, 997 g of an aqueous polymer latex was obtained, which had a solid content of 51.4% and a pH of 7.4. The aqueous polymer dispersion diluted with deionized water had a median particle diameter of 159 nm, determined by means of dynamic light scattering. The particle diameter of the diluted aqueous polymer dispersion at pH 12 was 186 nm.

Feed 1 (Emulsion of):

| 195.4 g | deionized water |
|---|---|
| 33.3 g | emulsifier solution 1 |
| 6.5 g | acrylic acid |
| 277.8 g | methyl metacrylate and |
| 211.8 g | 2-ethylhexyl acrylate |

Feed 1A:

| 7.5 g | methacrylic acid |
|---|---|

Feed 1B:

| 22.0 g | deionized water |
|---|---|

Feed 2 (Homogeneous Solution of):

| 8.6 g | 7% by weight aqueous solution of sodium peroxodisulfate |
|---|---|

Feed 3

| 7.5 g | 10% by weight aqueous solution of tert-butyl hydroperoxide |
|---|---|

Feed 4

| 3.8 g | 13.1% by weight aqueous solution of sodium acetone bisulfite |
|---|---|
| 7.3 g | deionized water |

Example 9 (Dispersion D9)

The polymerization was performed by the protocol of comparative example 3, except for the following. After having metered 16.7% of feed 1 (120.8 g), feed 1A and feed 1B were started simultaneously and metered into the reaction vessel within 5 min.

Thereby, 997 g of an aqueous polymer latex was obtained, which had a solid content of 51.3% and a pH of 7.4. The aqueous polymer dispersion diluted with deionized water had a median particle diameter of 157 nm, determined by means of dynamic light scattering. The particle diameter of the diluted aqueous polymer dispersion at pH 12 was 226 nm.

Example 10 (Dispersion D10)

The polymerization was performed by the protocol of comparative example 3, except for the following. After having metered 16.7% of feed 1 (120.8 g), feed 1A and feed 1B were started simultaneously and metered into the reaction vessel within 5 min. Feed 5 was metered into the reaction vessel in parallel with feed 1 within 120 min.
Feed 5

| | |
|---|---|
| 18.0 g | 10% by weight aqueous solution of sodium hydroxide |

Thereby, 997 g of an aqueous polymer latex was obtained, which had a solid content of 50.1% and a pH of 7.3. The aqueous polymer dispersion diluted with deionized water had a median particle diameter of 163 nm, determined by means of dynamic light scattering. The particle diameter of the diluted aqueous polymer dispersion at pH 12 was 211 nm.

Example 11 (Dispersion D11)

The polymerization was performed by the protocol of comparative example 3, except for the following. After having metered 16.7% of feed 1 (120.8 g), feed 1A and feed 6 were started simultaneously and metered into the reaction vessel within 5 min.
Feed 6

| | |
|---|---|
| 18.0 g | 2-ethylhexyl acrylate |
| 1.3 g | 2-ethylhexyl thioglycolate |

Thereby, 1003 g of an aqueous polymer latex was obtained, which had a solid content of 51.1% and a pH of 7.4. The aqueous polymer dispersion diluted with deionized water had a median particle diameter of 159 nm, determined by means of dynamic light scattering. The particle diameter of the diluted aqueous polymer dispersion at pH 12 was 203 nm.

Example 12 (Dispersion D12)

The polymerization was performed by the protocol of comparative example 3, except for the following. After having metered 16.7% of feed 1 (120.8 g), feed 1A and feed 7 were started simultaneously and metered into the reaction vessel within 5 min. Instead of 9.1 g of seed latex, 21.83 g of seed latex were used.
Feed 7

| | |
|---|---|
| 12.0 g | 2-ethylhexyl acrylate |
| 2.0 g | methacrylic acid |
| 1.3 g | 2-ethylhexyl thioglycolate |

Thereby, 1015 g of an aqueous polymer latex was obtained, which had a solid content of 51.4% and a pH of 7.3. The aqueous polymer dispersion diluted with deionized water had a median particle diameter of 130 nm, determined by means of dynamic light scattering. The particle diameter of the diluted aqueous polymer dispersion at pH 12 was 167 nm.

Example 13 (Dispersion D13)

The polymerization was performed by the protocol of comparative example 3, except for the following. After having metered 16.7% of feed 1 (120.8 g), feed 1A and feed 8 were started simultaneously and metered into the reaction vessel within 5 min.
Feed 8

| | |
|---|---|
| 12.5 g | n-butyl acrylate |
| 12.5 g | styrene |

Thereby, 1025 g of an aqueous polymer latex was obtained, which had a solid content of 50.9% and a pH of 7.5. The aqueous polymer dispersion diluted with deionized water had a median particle diameter of 158 nm, determined by means of dynamic light scattering. The particle diameter of the diluted aqueous polymer dispersion at pH 12 was 197 nm.

B Preparation of an Aqueous Latex-Pigment Composite (General Procedure)

B.1: Preparation of Composites from Polymer Dispersions CD1, CD3, D1-D6 and D9-D13

An aqueous $TiO_2$ slurry was prepared by mixing 70 parts by weight of a commercial $TiO_2$ pigment (Kronos® 2190) with an aqueous solution of 0.35 parts by weight of a commercial dispersant (carboxylic acid copolymer: Dispex® CX4320 of BASF SE) in 29.65 parts by weight of water and treating the mixture with a dissolver (Dispermat CA20 M-1, 2007 with 4 cm dissolver disc—VMA Getzmann) at 1200-1500 rpm for 15 minutes. For preparing the composite material, 20 parts by weight of the aqueous $TiO_2$ slurry were mixed with 10.24 parts by weight of a polymer latex (50% by weight) as described herein such that the mixture contained about 37% by weight of polymer, based on 100% of $TiO_2$ pigment. The mixture was treated with the above dissolver at 800-1000 rpm for 15 min. Subsequently, the pH was adjusted to pH 8.5.

B.2: Preparation of Composites from Polymer Dispersions CD2 and D7-D8

71.1 g of the polymer latex were charged into a 0.5 L plastic vessel (diameter 80 mm). 27.4 g of a commercial $TiO_2$ pigment (Kronos® 2190) were added with stirring. Then, 1.3 g of a commercial pigment dispersant polymer (Disperbyk® 190 of Byk Chemie GmbH) and 0.2 g of a commercial defoamer (Hydropalat WE 3240 of BASF SE) were added and the pH of the resulting mixture was adjusted by the addition of 2-amino-2-methylpropanol to pH 8.5. To this mixture, 320 g of grinding pearls (soda-lime glass, diameter 3 mm) were added and the mixture was stirred for 20 min. by means of a Teflon disk (diameter 60 mm) with a circumferential speed of 7 m/s. Thereafter the grinding pearls were filtered off.

C Investigation of the Aqueous Polymer Composite Dispersions by Analytical Ultracentrifuge Before the measurements of the composites were performed, the composites were left for at least 24 h at 22° C.

The aqueous polymer composite dispersions prepared by the protocol described in item B were diluted with water (pH 8.5) to a polymer concentration of 1 g/L. The diluted dispersions were analyzed in an ultracentrifuge type Beckman Optima XL-I (Beckman Instruments, Palo Alto, USA) with optical interference detection (675 nm) using a AN 50 Ti®-rotor with 8 measurement cells. The measuring method allows for recording the change of the radial concentration profile of the particles which differ in their sedimentation for the whole measurement period. In situ detection of the particle sedimentation in the centrifugal field allows for optimal separation of pigment and free polymer particles of the latex (free latex particles) and also for direct measurement of the concentration of the free latex particles. Typically at about 8000 rpm the free latex particles form a front which sediments towards the bottom of the measurement cell. Sedimentation can be detected by the optical interference detection as a shift of a stripe. The shift of stripes is proportional to the specific refractive index increment of the polymer and the absolute concentration of the latex particles. The specific refractive index increment of the polymer had been previously determined by measuring a control of the latex without pigment.

The diluted aqueous polymer composite dispersions were centrifuged at <3000 rpm for 10 minutes. Thereby, the rapidly sedimenting $TiO_2$ particles and, if present, the polymer-pigment composite particles were separated from the free latex particles. Then the rotational speed was incrementally increased to about 8000 rpm in order to analyze the free latex particles. The thus determined relative amount of free latex is summarized in table 1. The relative amount of free latex is subtracted from 100% to determine the amount of latex bound in the polymer composite particles. As a control, the respective latex was diluted with water (pH 8.5) to a polymer concentration of 1 g/L, and analyzed in parallel in one of the measurement cells.

TABLE 1

| Polymer latex | Free latex [% by weight] | Latex bound in composite [% by weight][1) |
|---|---|---|
| D1 | 39 | 61 |
| CD1 | 85 | 15 |
| D7 | 62 | 38 |
| D8 | 51 | 49 |
| CD2 | 93 | 7 |
| CD3 | 72 | 28 |
| D9 | 18 | 82 |
| D10 | 18 | 82 |
| D11 | 59 | 41 |
| D12 | 61 | 39 |
| D13 | 40 | 60 |

[1)]calculated from free latex

D Preparation of an Acid Curable Varnish

Varnish LV8 a) 71.1 g of the polymer latex D8 of example 8 were charged into a 0.5 L plastic vessel (diameter 80 mm). 27.4 g of a commercial $TiO_2$ pigment (Kronos® 2190) were added with stirring. Then, 1.3 g of a commercial pigment dispersant polymer (Disperbyk® 190 of Byk Chemie GmbH) and 0.2 g of a commercial defoamer (Hydropalat WE 3240 of BASF SE) were added and the pH of the resulting mixture was adjusted by the addition of 2-amino-2-methylpropanol to pH 8.5. To this mixture, 320 g of grinding pearls (soda-lime glass, diameter 3 mm) were added and the mixture was stirred for 20 min. by means of a Teflon disk (diameter 60 mm) with a circumferential speed of 7 m/s. Thereafter the grinding pearls were filtered off.

b) 16.1 g of the polymer latex D8 were added to 65.9 g of the dispersion of step a). Then 17.9 g of a commercial aqueous melamine formaldehyde resin, partially etherified with methanol and ethanol, solid content 80% by weight, were added and the pH of the resulting mixture was adjusted by the addition of 2-amino-2-methylpropanol to pH 8.0. Immediately prior to use, the mixture was acidified to pH 4.0 by addition of 2.0 g of an aqueous solution of p-toluene sulfonic acid.

Varnish LV7

Varnisch LCV7 was prepared by analogy to varnish LV8 using same amounts of polymer latex D7 of example 7 in steps a) and b) of the protocol.

Varnish LCV2

Varnisch LCV2 was prepared by analogy to varnish LV8 using same amounts of polymer latex CD2 of comparative example 2 in steps a) and b) of the protocol.

Testing of the Contrast Ratio

The acid curable varnishes LV7, LV8 and LCV2 were tested with regard to their contrast ratio on Leneta foil having black and white parts (Leneta opacity card) by the following protocol. Immediately after the addition of p-toluene sulfonic acid the varnish was coated by means of a blade coater with a wet film thickness of 40 μm to the Leneta foil. Then, the coated foil was physically dried for 1 h at ambient temperature followed by curing for 180 s at 160° C. in a drying oven.

The contrast ratio (Rb/Rw) was determined spectrophotometrically as the ratio of reflected light from the coating over the black portions (Rb) and the white portions (Rw) of the card expressed as a percentage. The contrast ratio indicates the capability of the coating to hide the black surface and thus indicates the hiding power of the coating.

The varnish LV7 based on polymer dispersion D7 showed a contrast ratio of 84%.

The varnish LV8 based on polymer dispersion D8 showed a contrast ratio of 85%.

The varnish LCV2 based on polymer dispersion CD2 only showed a contrast ratio of 79%.

E Preparation of Paint for Exterior Wall Coating

A paint for exterior wall coating was prepared by mixing the following ingredients in the given order:

| | |
|---|---|
| 192 g | deionized water |
| 3 g | hydroxyethylcellulose thickener |
| 2 g | aqueous ammonia (25%) |
| 2 g | dispersant 1 (polyacrylic acid) |
| 3 g | dispersant 2 (sodium polyphosphate) |
| 2 g | preservative 1 (concentrate of CMI/MI and (ethylenedioxy)dimethanol) |
| 10 g | preservative 2 (concentrate of terbutryn, carbendazim and pyrithione zinc) |
| 2 g | defoamer (based on hydrocarbon) |
| 10 g | propylene glycol |
| 10 g | butyl diglycol |
| 5 g | Texanol |
| 190 g | $TiO_2$ pigment |
| 190 g | filler based on calcium carbonate (5 μm) |
| 50 g | talcum filler |
| 320 g | polymer latex (50% by weight) |
| 2 g | defoamer (based on hydrocarbon) |
| 16 g | thickener with Newtonian rheology behavior based on polyether |

The overall solids content of the paint was 58% by weight, the PVC was 47%.

Opacity, respectively hiding power, reflects the ability of a coating to cover a substrate. It can be quantified by spreading rate measurements. These measurements are performed by applying different film thicknesses using a drawdown bar i.e. doctor blade (e.g. 150, 200, 220 and 250 micrometer wet) onto a defined contrast paper, e.g. Leneta foil with black & white areas and subsequent measurement of contrast ratios. Afterwards, the values are interpolated to yield the so called spreading rate, which is the reciprocal of the volume of the paint per area [$m^2$/L] (inverse of the film thickness) which is required to cover a substrate at a given contrast ratio, e.g. 98% for a Class II hiding paint according to ISO DIN 13300.

The paint based on the polymer latex CD1 of comparative example 1 showed a spreading rate of 7.1 while the paint based on the polymer latex D2 of example 2 showed a spreading rate of 7.5.

The invention claimed is:

1. A process for preparing an aqueous polymer latex, the process comprising polymerising a monomer composition M by a radical emulsion polymerisation, where the monomer composition M comprises:
   a) 80 to 99.95% by weight, based on a total weight of the monomer composition M, of at least one ethylenically unsaturated monomer M1 selected from the group consisting of:
      a monomer M1a, selected from the group consisting of $C_1$-$C_{20}$-alkyl esters of acrylic acid and $C_5$-$C_{20}$-alkylesters of methacrylic acid, and
      a monomer M1b, selected from the group consisting of vinyl aromatic monomers, $C_1$-$C_4$-alkyl esters of methacrylic acid, and mixtures thereof;
   b) 0.05 to 5% by weight, based on the total weight of the monomer composition M, of at least one monoethylenically unsaturated monomer M2 selected from the group consisting of monoethylenically unsaturated monocarboxylic acids having 3 to 6 carbon atoms and monoethylenically unsaturated dicarboxylic acids having 4 to 6 carbon atoms;
   c) 0 to 20% by weight of non-ionic monomers M3, which are different from monomers M1;
   wherein:
   at least 95% of the monomer composition M to be polymerised is metered during a period P to a polymerisation reaction under polymerisation conditions; and
   during at least one period P(n) within the period P, a relative amount of the at least one monomer M2, which is metered to the polymerisation reaction during the at least one period P(n), to a total amount of the monomer composition M, which is metered to the polymerisation reaction during the at least one period P(n), is at least 1% by weight higher than a relative amount of the at least one monomer M2, which is metered to the polymerisation reaction outside of each of the at least one period P(n), to a total amount of the monomer composition M, which is metered to the polymerisation reaction outside of each of the at least one period P(n),
   where the first period P(n) starts at a point of time t(s) and the last period P(n) ends at a point of time t(e),
   where t(s) is at a point of time, where at least 10% of a total amount of the monomer composition M to be polymerised has been metered to the polymerisation reaction and where t(e) is at a point in time, where at most 90% of the total amount of the monomer composition M to be polymerised has been metered into the polymerisation reaction and
   wherein, during each of the at least one period P(n), a ratio of the at least one monomer M2 to a total amount of the at least one monomer M1+monomers M3 is increased from less than 0.04:1 to more than 0.04:1 and decreased to less than 0.04:1 at the end of each of the at least one period P(n).

2. The process of claim 1, wherein at least one of the following features i), ii) and iii) is satisfied:
   i) a total amount of the at least one monomer M2 metered to the polymerization reaction during the at least one period P(n) is at least 20% of the at least one monomer M2 contained in the monomer composition M;
   ii) a relative amount of the at least one monomer M2 metered to the polymerization reaction during all of the at least one period P(n) is from 0.1 to 3% by weight based on the total weight of the monomer composition M; and
   iii) a total amount of the at least one monomer M2 is from 0.2 to 5% by weight based on a total weight of the monomer composition M.

3. The process of claim 1, wherein at least one of the following features iv), v) and vi) is satisfied:
   iv) a ratio of the duration of all the at least one period P(n) to the duration of the period P is from 0.002:1 to 0.5:1;
   v) the duration of period P is from 0.5 h to 5 h; and
   vi) the duration of all the at least one period P(n) is from 0.5 min to 1 h.

4. The process of claim 1, wherein the duration of all of the at least one P(n) is from 30 seconds to 60 minutes.

5. The process of claim 1, where the monomer composition M comprises at least one vinylaromatic monomer.

6. The process of claim 5, where the at least one vinylaromatic monomer is metered to the polymerisation reaction during the at least one period P(n).

7. The process of claim 1, where the monomer M1a is a $C_2$-$C_{10}$-alkyl ester of acrylic acid.

8. The process of claim 1, where the at least one monomer M2 is selected from the group consisting of acrylic acid, methacrylic acid, and mixtures thereof.

9. The process of claim 1, where the monomers M3 are selected from the group consisting of hydroxyalkylesters of acrylic acid, hydroxyalkylesters of methacrylic acid, and mixtures thereof.

10. An aqueous polymer latex obtained by the process of claim 1.

11. A water-borne coating composition, comprising the aqueous polymer latex of claim 10 as a binder or co-binder.

12. An aqueous coating composition, comprising the aqueous polymer latex of claim 10 as a binder or co-binder and a titanium dioxide pigment.

13. A process, comprising forming a particulate polymer composition of titanium dioxide particles with the aqueous polymer latex of claim 10.

14. An aqueous dispersion of a polymer composite of titanium dioxide, comprising composite particles of titanium dioxide particles and polymer particles of the aqueous polymer latex of claim 10.

15. The aqueous dispersion of claim 14, where a weight ratio of the polymer particles to the titanium dioxide particles is from 0.1:1 to 5:1.

16. The aqueous polymer latex of claim 10, wherein the aqueous polymer latex satisfies the following features a) and b):
   a) at pH 12 and 22° C. the aqueous polymer latex shows a Z average particle diameter of 1.2 to 1.8 times of the Z average diameter of the polymer latex at pH 8 and 22° C., as determined by dynamic light scattering of a 0.01% by weight aqueous dilution of the aqueous polymer latex at the respective pH, and b) the aqueous polymer latex shows a Z average particle diameter in a range from 50 to 500 nm, as determined by dynamic light scattering of a 0.01% by weight aqueous dilution of the aqueous polymer latex at pH 8 and 22° C.

17. A process for preparing an aqueous polymer latex, the process comprising polymerising a monomer composition M by a radical emulsion polymerisation, where the monomer composition M comprises:
   a) 80 to 99.95% by weight, based on a total weight of the monomer composition M, of at least one ethylenically unsaturated monomer M1 selected from the group consisting of:
      a monomer M1a, selected from the group consisting of $C_1$-$C_{20}$-alkyl esters of acrylic acid and $C_5$-$C_{20}$-alkylesters of methacrylic acid, and
      a monomer M1b, selected from the group consisting of vinyl aromatic monomers, $C_1$-$C_4$-alkyl esters of methacrylic acid, and mixtures thereof;
   b) 0.05 to 5% by weight, based on the total weight of the monomer composition M, of at least one monoethylenically unsaturated monomer M2 selected from the group consisting of monoethylenically unsaturated monocarboxylic acids having 3 to 6 carbon atoms and monoethylenically unsaturated dicarboxylic acids having 4 to 6 carbon atoms;
   c) 0 to 20% by weight of non-ionic monomers M3, which are different from monomers M1;
   wherein:
   at least 95% of the monomer composition M to be polymerised is metered during a period P to a polymerisation reaction under polymerisation conditions; and
   during at least one period P(n) within the period P, a relative amount of the at least one monomer M2, which is metered to the polymerization reaction during the at least one period P(n), to a total amount of the monomer composition M, which is metered to the polymerisation reaction during the at least one period P(n), is at least 1% by weight higher than a relative amount of the at least one monomer M2, which is metered to the polymerisation reaction outside of each of the at least one period P(n), to a total amount of the monomer composition M, which is metered to the polymerisation reaction outside of each of the at least one period P(n),
   where the first period P(n) starts at a point of time t(s) and the last period P(n) ends at a point of time t(e),
   where t(s) is at a point of time, where at least 10% of a total amount of the monomer composition M to be polymerised has been metered to the polymerisation reaction and where t(e) is at a point of time, where at most 90% of the total amount of the monomer composition M to be polymerised has been metered into the polymerisation reaction and the monomer composition M comprises at least one vinylaromatic monomer.

18. The process of claim 17, wherein at least one of the following features i), ii) and iii) is satisfied:
   i) a total amount of the at least one monomer M2 metered to the polymerization reaction during the at least one period P(n) is at least 20% of the at least one monomer M2 contained in the monomer composition M;
   ii) a relative amount of the at least one monomer M2 metered to the polymerization reaction during all of the at least one P(n) is from 0.1 to 3% by weight based on the total weight of the monomer composition M; and
   iii) a total amount of the at least one monomer M2 is from 0.2 to 5% by weight based on a total weight of the monomer composition M.

19. The process of claim 17, wherein at least one of the following features iv), v) and vi) is satisfied:
   iv) a ratio of the duration of all the at least one period P(n) to the duration of the period P is from 0.002:1 to 0.5:1;
   v) the duration of period P is from 0.5 h to 5 h; and
   vi) the duration of all the at least one period P(n) is from 0.5 min to 1 h.

20. The process of claim 17, where the at least one vinylaromatic monomer is metered to the polymerisation reaction during the at least one period P(n).

21. The process of claim 17, where the monomer M1a is a $C_2$-$C_{10}$-alkyl ester of acrylic acid.

22. The process of claim 17, where the at least one monomer M2 is selected from the group consisting of acrylic acid, methacrylic acid, and mixtures thereof.

23. The process of claim 17, where the monomers M3 are selected from the group consisting of hydroxyalkylesters of acrylic acid, hydroxyalkylesters of methacrylic acid, and mixtures thereof.

24. An aqueous polymer latex obtained by the process of claim 17.

25. A water-borne coating composition, comprising the aqueous polymer latex of claim 24 as a binder or co-binder.

26. An aqueous coating composition, comprising the aqueous polymer latex of claim 24 as a binder or co-binder and a titanium dioxide pigment.

27. The aqueous polymer latex of claim 24, wherein the aqueous polymer latex satisfies the following features a) and b):
   a) at pH 12 and 22° C. the aqueous polymer latex shows a Z average particle diameter of 1.2 to 1.8 times of the Z average diameter of the polymer latex at pH 8 and 22° C., as determined by dynamic light scattering of a 0.01% by weight aqueous dilution of the aqueous polymer latex at the respective pH, and
   b) the aqueous polymer latex shows a Z average particle diameter in a range from 50 to 500 nm, as determined by dynamic light scattering of a 0.01% by weight aqueous dilution of the aqueous polymer latex at pH 8 and 22° C.

* * * * *